(12) United States Patent
Kishigami et al.

(10) Patent No.: US 9,500,741 B2
(45) Date of Patent: Nov. 22, 2016

(54) RADAR APPARATUS

(71) Applicant: Panasonic Corporation, Osaka (JP)

(72) Inventors: Takaaki Kishigami, Tokyo (JP); Yoichi Nakagawa, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 201 days.

(21) Appl. No.: 14/583,364

(22) Filed: Dec. 26, 2014

(65) Prior Publication Data

US 2015/0198697 A1   Jul. 16, 2015

(30) Foreign Application Priority Data

Jan. 15, 2014   (JP) ................. 2014-005436
Sep. 2, 2014    (JP) ................. 2014-177635

(51) Int. Cl.
*G01S 13/42*   (2006.01)
*G01S 7/292*   (2006.01)
*G01S 7/41*    (2006.01)
*G01S 13/26*   (2006.01)
(Continued)

(52) U.S. Cl.
CPC .......... *G01S 7/2923* (2013.01); *G01S 7/411* (2013.01); *G01S 7/414* (2013.01); *G01S 7/415* (2013.01); *G01S 13/26* (2013.01); *G01S 13/325* (2013.01); *G01S 13/343* (2013.01); *G01S 13/582* (2013.01); *G01S 13/931* (2013.01); *G01S 7/2813* (2013.01); *G01S 2007/2886* (2013.01); *G01S 2013/9375* (2013.01); *G01S 2013/9385* (2013.01)

(58) Field of Classification Search
CPC .... G01S 7/2923; G01S 13/325; G01S 7/414; G01S 13/582; G01S 13/26; G01S 7/415; G01S 7/411; G01S 13/343; G01S 13/931; G01S 2013/9385; G01S 2013/9375; G01S 7/2813; G01S 2007/2886
USPC ........ 342/145–147, 107–108, 113–114, 133, 342/139, 192, 196, 70–72
See application file for complete search history.

(56) References Cited

U.S. PATENT DOCUMENTS 5,818,383 A * 10/1998 Stockburger .............. G01S 3/46
                                                    342/109
9,229,102 B1 * 1/2016 Wright .................. G01S 13/888
(Continued)

FOREIGN PATENT DOCUMENTS

JP    2004-177289    6/2004
JP    2007-285912   11/2007
JP    2010-043960    2/2010

*Primary Examiner* — John B Sotomayor
(74) *Attorney, Agent, or Firm* — Seed IP Law Group LLP

(57) ABSTRACT

A radar apparatus is installed in a vehicle that moves along its direction of travel. A radar transmission unit transmits a high frequency radar transmission signal from a transmit antenna in each transmit period. In a radar reception unit, antenna system processing units each generate a correlation vector by computing the correlation between reflected wave signal from a stationary object or a moving object and the radar transmission signal. A Doppler frequency-azimuth conversion unit converts Doppler frequencies into the components of an azimuth in which the stationary object is present using an estimated vehicle speed vector for the vehicle. A stationary object azimuth estimation unit generates the power profile of the reflected wave signal using the correlation vector and a direction vector corresponding to the components of the azimuth in which the stationary object is present.

9 Claims, 10 Drawing Sheets

(51) Int. Cl.
*G01S 13/32* (2006.01)
*G01S 13/34* (2006.01)
*G01S 13/58* (2006.01)
*G01S 13/93* (2006.01)
G01S 7/28 (2006.01)
G01S 7/288 (2006.01)

(56) References Cited

U.S. PATENT DOCUMENTS

| | | | |
|---|---|---|---|
| 2003/0210179 A1* | 11/2003 | Dizaji | G01S 7/292 342/159 |
| 2005/0285773 A1* | 12/2005 | Hartzstein | G01S 7/032 342/70 |
| 2007/0024492 A1* | 2/2007 | Takano | G01S 3/74 342/70 |
| 2010/0073216 A1* | 3/2010 | Sakamoto | G01S 3/74 342/70 |
| 2011/0084872 A1* | 4/2011 | Kishida | G01S 3/48 342/146 |
| 2013/0314272 A1* | 11/2013 | Gross | G01S 13/931 342/70 |
| 2014/0062763 A1* | 3/2014 | Kishigami | G01S 13/42 342/158 |
| 2014/0327567 A1* | 11/2014 | Kishigami | G01S 13/91 342/146 |
| 2015/0198697 A1* | 7/2015 | Kishigami | G01S 7/2923 342/145 |
| 2015/0369912 A1* | 12/2015 | Kishigami | G01S 13/26 342/113 |

* cited by examiner

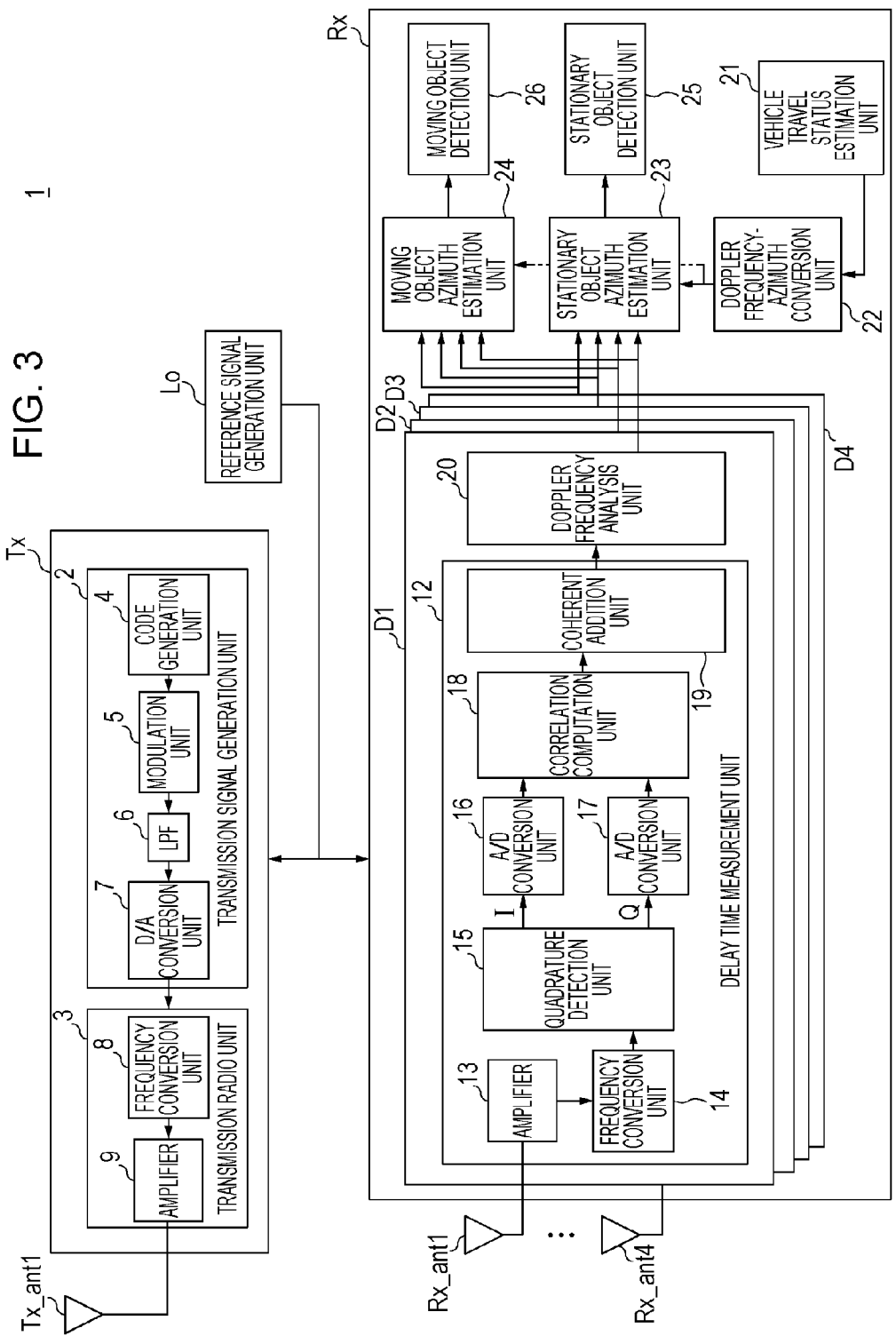

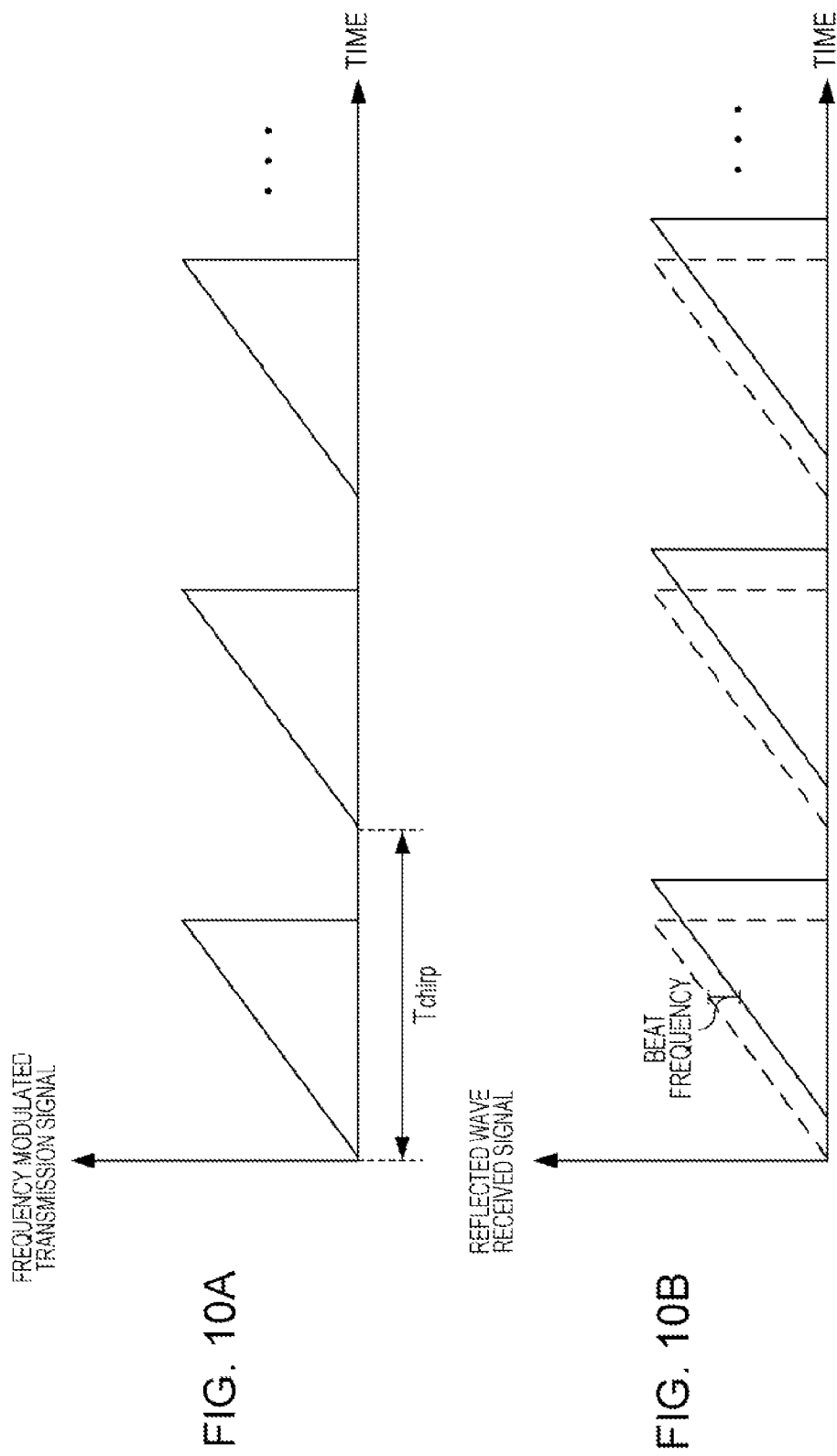

RADAR APPARATUS

CROSS REFERENCES TO RELATED APPLICATIONS

This application claims priority to Japanese Patent Applications No. 2014-005436, filed on Jan. 15, 2014, and No. 2014-177635, filed on Sep. 2, 2014, the contents of each of which are hereby incorporated by reference.

BACKGROUND

1. Technical Field

The present disclosure relates to a radar apparatus for installation in a mobile unit including a vehicle.

2. Description of the Related Art

A radar apparatus is known in which reflected wave signals reflected by a target (hereinafter referred to as an object or target object) are received by an array antenna and the phase differences in the received signals received by the individual receive antennas are measured to estimate the direction in which the reflected wave signals from the object arrive over a wide angle range.

A conventional technique in which a radar apparatus which is capable of measurement over a wide angle range is installed in a mobile unit (a vehicle for example) and the relative speed of a nearby object with respect to the radar apparatus is detected is described in Japanese Unexamined Patent Application Publication No. 2010-043960, for instance.

A vehicle travel status detection device described in Japanese Unexamined Patent Application Publication No. 2010-043960 identifies a stationary object using radar apparatuses for lateral area monitoring installed in front of both sides of the vehicle. More specifically, the vehicle travel status detection device uses the azimuth $\phi$ and relative speed Vd0 of an electromagnetic wave reflection portion that is situated closest to the vehicle to correct the measured relative speed Vd0 of the electromagnetic wave reflection portion to Vd=Vd0×cos $\phi$. The vehicle travel status detection device determines that a collection of electromagnetic wave reflection portions are a stationary object when the corrected relative speed Vd is equivalent to the detected value V0 of a speedometer provided in the vehicle. The value $\phi$ indicates the azimuth of an electromagnetic wave reflection portion, where the front direction of the vehicle is the reference ($\phi$=0).

SUMMARY

Japanese Unexamined Patent Application Publication No. 2010-043960 uses a detected value for the azimuth angle of an electromagnetic wave reflection portion, but includes no specific description about how the azimuth angle of the electromagnetic wave reflection portion is estimated.

With the vehicle travel status detection device described in Japanese Unexamined Patent Application Publication No. 2010-043960, a side lobe or a grating lobe, which is a pseudo peak not corresponding to a reflected wave signal from the target, can be generated in the azimuth direction in estimation of the azimuth angle of an electromagnetic wave reflection portion. Since it is difficult with the vehicle travel status detection device disclosed in Japanese Unexamined Patent Application Publication No. 2010-043960 to distinguish between a reflected wave signal from the target and a side lobe or grating lobe, an incorrect estimation of the azimuth angle of the target can occur, leading to a reduction in the accuracy of object detection.

One non-limiting and exemplary embodiment provides a radar apparatus that reduces incorrect estimations caused by side lobes and grating lobes occurring in the azimuth direction to improve the accuracy of object detection in estimation of the azimuth angle of an object using a receive array antenna.

The present disclosure provides a radar apparatus for installation in a mobile unit, including a radar transmission unit that transmits a radar transmission signal in a high frequency band from a transmit antenna in each transmit period; and a radar reception unit that receives a reflected wave signal resulting from the radar transmission signal being reflected off one or more stationary objects or one or more moving objects with each of a plurality of receive antennas, wherein the radar reception unit includes: a plurality of antenna system processing units that each generate a correlation signal including arrival delay information for the reflected wave signal by computing a correlation between the reflected wave signal and the radar transmission signal and that output information based on a first plurality of Doppler frequencies contained in the correlation signal; a Doppler frequency-azimuth conversion unit that converts a second plurality of Doppler frequencies estimated frequencies caused by the stationary objects into a first azimuth component in accordance with movement information for the mobile unit in same frequency as the first plurality of Doppler frequencies; and a stationary object azimuth estimation unit that generates a first power profile for a first predetermined range including an azimuth in which the present of stationary object is estimated using the result of computation based on the information of the first plurality of Doppler frequencies and the first azimuth component.

These general and specific aspects may be implemented using a system, a method, and a computer program, and any combination of systems, method, and computer programs.

According to the present disclosure, incorrect estimations caused by side lobes or grating lobes occurring in the azimuth direction can be reduced to improve the accuracy of object detection in estimation of the azimuth angle of an object using a receive array antenna.

BRIEF DESCRIPTION OF THE DRAWINGS

FIG. 3 is a detailed block diagram of the internal configuration of the radar apparatus in the first embodiment;

FIG. 10A is a diagram illustrating the relationship between a frequency modulated transmission signal and its transmit period; and FIG. 10B is a diagram showing a reflected wave received signal resulting from the frequency modulated transmission signal shown in FIG. 10A being reflected off a stationary object or a moving object.

Figure 1:
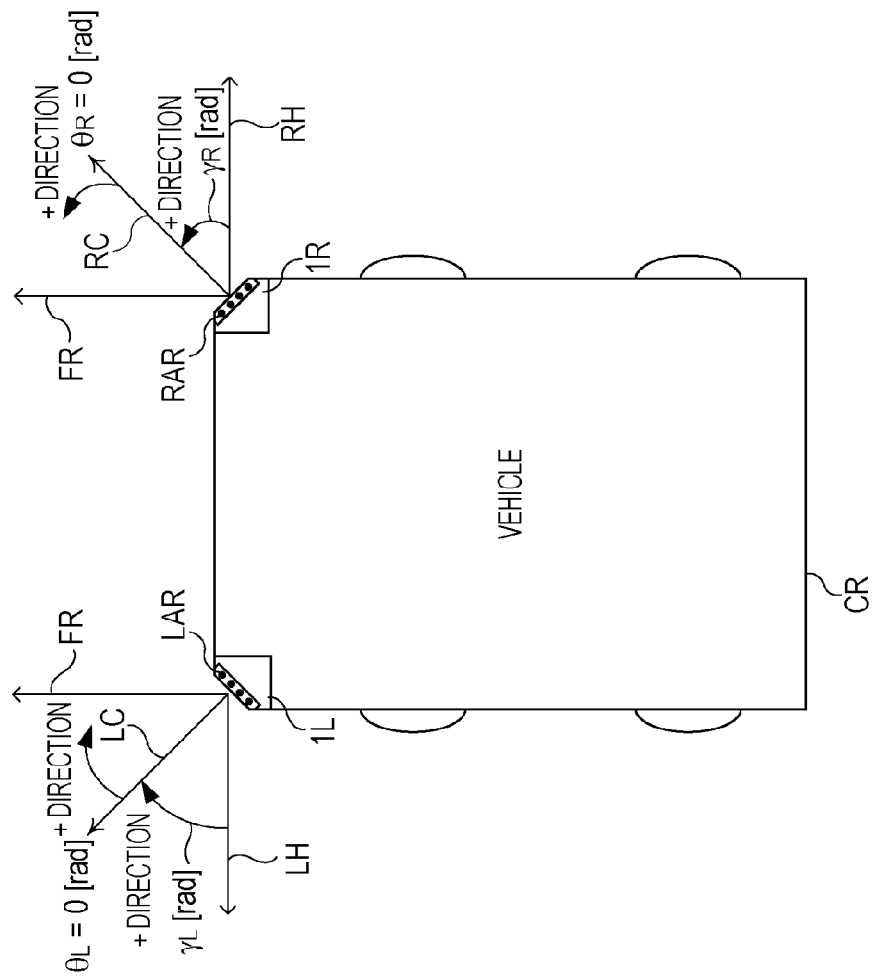
FIG. 1 is a diagram illustrating the relationship between a vehicle coordinate system and a radar coordinate system.

DETAILED DESCRIPTION (Underlying Knowledge Forming Basis of the Embodiments of the Radar Apparatus According to the Present Disclosure)

Prior to describing the embodiments of the radar apparatus according to the present disclosure, underlying knowledge forming basis of the embodiments of the radar apparatus according to the present disclosure is described.

In conventional techniques including the Japanese Unexamined Patent Application Publication No. 2010-043960 mentioned above, a radar apparatus receives reflected wave signals which are generated by a transmitted signal being reflected off a target object (the target) with a receive array antenna and then detects the spectrum in the azimuth direction in the measurement range for the target's azimuth angle. Occurrence of a side lobe or a grating lobe in the azimuth direction spectrum in the azimuth direction of the target makes it difficult for the radar apparatus to distinguish between a reflected wave signal from the target and the side lobe or grating lobe. This leads to an incorrect estimation of the target's azimuth angle and a decrease in the accuracy of target detection in conventional art radar apparatuses.

As a solution to this problem, use of an existing high-resolution azimuth angle estimation algorithm (Capon and MUSIC methods, for instance) can keep the side lobe level low, but increases the amount of signal processing performed in the radar apparatus because they involve inverse matrix calculation and/or eigenvalue calculation of the order of the number of receive array elements. Meanwhile, conventional art radar apparatuses can suppress an increase in the amount of computation and further keep the side lobe level low by weighting the amplitude components of reflected wave signals received by an array antenna using a prescribed window function. However, since the window function processing causes expansion of the main lobe, the accuracy of azimuth estimation lowers in conventional art radar apparatuses.

The embodiments described below therefore set forth a radar apparatus that improves the accuracy of object detection by preventing at least one of an increase in the amount of computation for signal processing on reflected wave signals, reduction in the accuracy of azimuth estimation, and incorrect estimation caused by a side lobe or grating lobe that occurs in the azimuth direction in estimation of the azimuth angle of a target object using a receive array antenna.

Embodiments of the radar apparatus according to the present disclosure will be described with reference to drawings. The radar apparatus according to the present disclosure is installed in a mobile unit (a vehicle CR for example, which also applies to the following descriptions) that moves in a straight or curved line along the direction of travel. The mobile unit in which a radar apparatus 1 is installed is not limited to the vehicle CR, but includes a motorperiod (a motorbike) and a robot capable of moving in a self-contained manner, for example.

First Embodiment

FIG. 1 is a diagram illustrating the relationship between a vehicle coordinate system and a radar coordinate system. In this embodiment, two radar apparatuses 1L and 1R are installed, for example, on the front lateral sides of the vehicle CR with respect to the front direction FR thereof; however two radar apparatuses may be installed on the rear lateral sides of the vehicle CR instead.

In FIG. 1, the installation angle $\gamma_L$ of multiple receive antennas (hereinafter referred to as an array antenna) of the radar apparatus 1L is the angle formed between the left side direction LH of the vehicle CR (the reference of left lateral radar installation angle) and the vertical direction LC of the aperture plane of the array antenna LAR of the radar apparatus 1L. For the installation angle $\gamma_L$ of the array antenna LAR of the radar apparatus 1L, the clockwise direction is the normal direction ($\gamma_L>0$) relative to the left side direction LH of the vehicle CR. Also, the clockwise direction is the normal direction when the vertical direction LC of the aperture plane of the array antenna LAR of the radar apparatus 1L is the reference direction ($\theta_L=0$) for the azimuth angle in the radar apparatus 1L.

The left side direction LH of the vehicle CR refers to the direction vertical to the direction of straight-line travel of the vehicle CR. The vertical direction LC of the aperture plane of the array antenna LAR of the radar apparatus 1L refers to the direction that is vertical to the substrate on which the array antenna LAR is disposed, for example.

The installation angle $\gamma_R$ of the array antenna RAR of the radar apparatus 1R is the angle formed between the right side direction RH of the vehicle CR (the reference of right lateral radar installation angle) and the vertical direction RC of the aperture plane of the array antenna RAR of radar apparatus 1R. For the installation angle $\gamma_R$ of the array antenna RAR of the radar apparatus 1R, the counterclockwise direction is the normal direction ($\gamma_R>0$) relative to the right side direction RH of the vehicle CR. Also, the counterclockwise direction is the normal direction when the vertical direction RC of the aperture plane of the array antenna RAR of the radar apparatus 1R is the reference direction ($\theta_R=0$) for the azimuth angle in the radar apparatus 1R.

The right side direction RH of the vehicle CR refers to the direction vertical to the direction of straight-line travel of the vehicle CR. The vertical direction RC of the aperture plane of the array antenna RAR of the radar apparatus 1R refers to the direction that is vertical to the substrate on which the array antenna RAR is disposed, for example.

As the radar apparatuses 1L, 1R have similar internal structures, they will be described as the radar apparatus 1 using installation angle $\gamma$ and azimuth angle $\theta$, for example, and distinguished as the radar apparatus 1L and the radar apparatus 1R when necessary.

Figure 2:
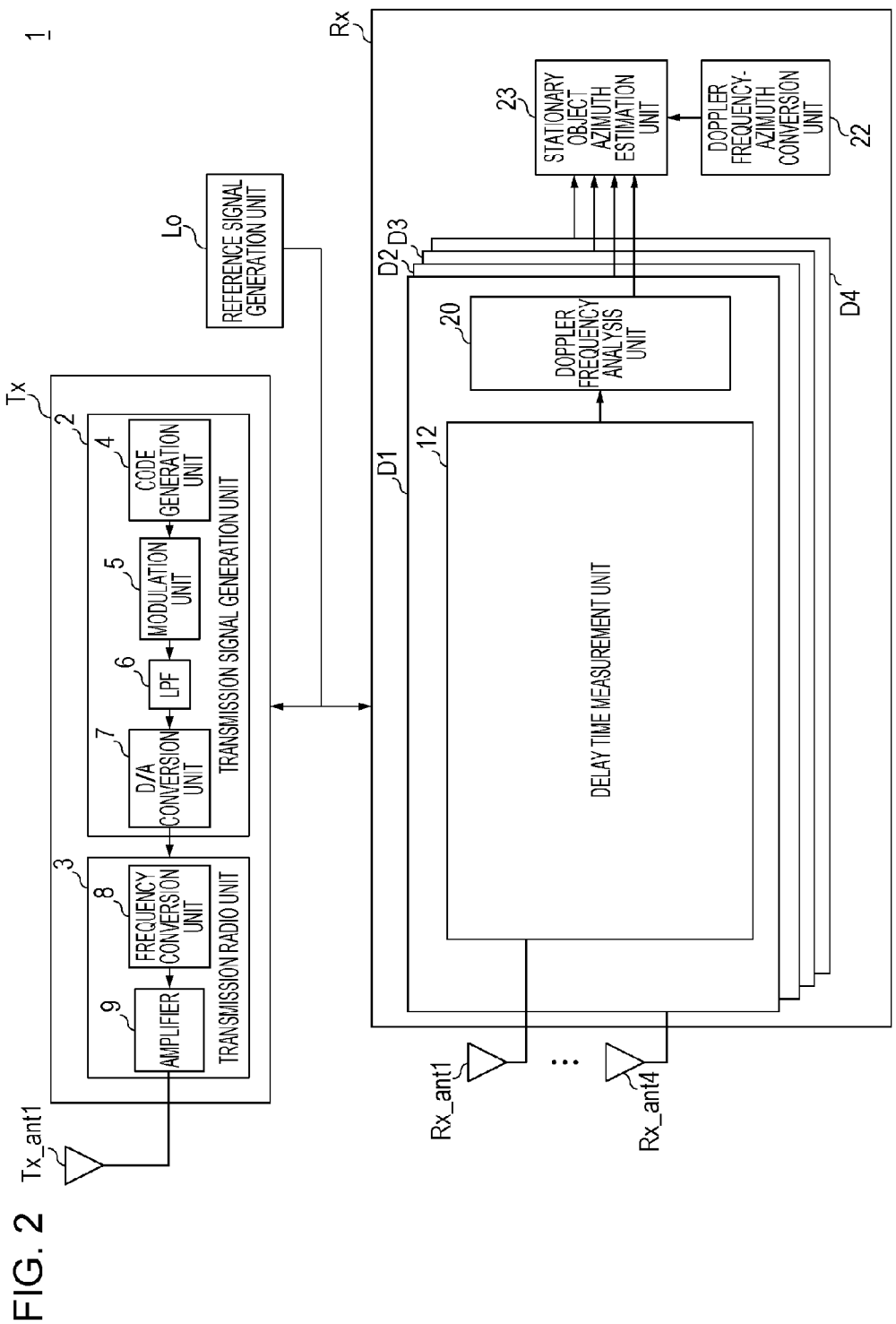
FIG. 2 is a block diagram generally showing the internal configuration of a radar apparatus in a first embodiment.
Figure 4A:
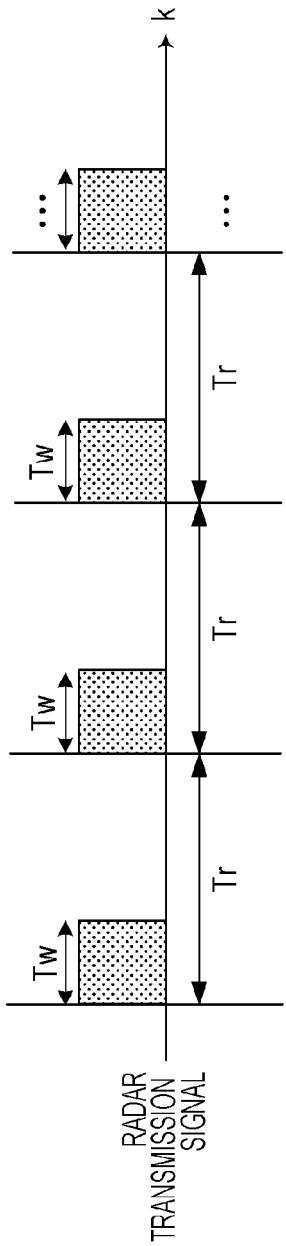
FIG. 4A is a diagram showing the relationship between the transmission slot and the transmit period of a radar transmission signal.
Figure 4B:
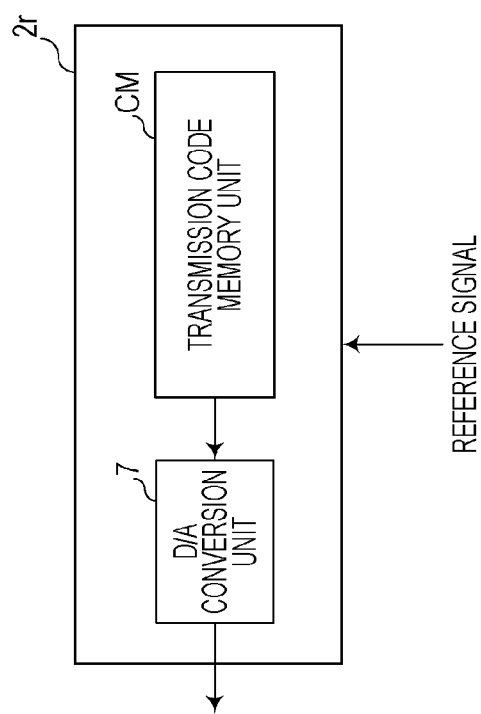
FIG. 4B is a block diagram showing an alternative internal configuration of a transmission signal generation unit.

Next, the configuration and operation of the radar apparatus 1 in the first embodiment will be described with reference to FIGS. 2 to 8. FIG. 2 is a block diagram generally showing the internal configuration of the radar apparatus 1 in the first embodiment. FIG. 3 is a detailed block diagram of the internal configuration of the radar apparatus 1 in the first embodiment. FIG. 4A is a diagram showing the relationship between the transmission slot and transmit period of a radar transmission signal. FIG. 4B is a block diagram showing an alternative internal configuration of a transmission signal generation unit.

The radar apparatus 1 transmits a radar transmission signal of a high frequency generated by a radar transmission unit Tx from a transmit antenna Tx_ant1. The radar apparatus 1 receives a reflected wave signal, which results from the radar transmission signal being reflected off an object (not shown), with an array antenna (the four receive antennas Rx_ant1 to Rx_ant4 shown in FIG. 2, for example). The array antenna LAR (RAR) of the radar apparatus 1L (radar apparatus 1R) shown in FIG. 1 includes the four receive antennas Rx_ant1 to Rx_ant4 of the radar apparatus 1 shown in FIG. 2. The transmit antenna Tx_ant1 may be provided either on the same substrate as the receive antennas Rx_ant1 to Rx_ant4 or a separate substrate.

The radar apparatus 1 detects objects (stationary objects and moving objects) through signal processing on the reflected wave signals received by the four receive antennas Rx_ant1 to Rx_ant4, and estimates the relative speed $v_{ds}$ of a stationary object and the relative speed $v_{dm}$ of a moving object with reference to the vehicle CR in which the radar apparatus 1 (radar apparatuses 1L, 1R) is installed.

Stationary and moving objects are objects to be detected by the radar apparatus 1 and include, for example, automobiles, biperiods, motorbikes, and human beings, which also applies to the embodiments described below. The receive antennas Rx_ant1 to Rx_ant4 may be formed from receive antenna elements. The number of receive antennas that constitute the array antenna of the radar apparatus 1 is not limited to four.

The components of the radar apparatus 1 will be briefly described first.

The radar apparatus 1 shown in FIG. 2 includes a reference signal generation unit Lo, a radar transmission unit Tx, and a radar reception unit Rx. The radar transmission unit Tx includes a transmission signal generation unit 2, and a transmission radio unit 3 connected with the transmit antenna Tx_ant1.

The reference signal generation unit Lo is connected to the radar transmission unit Tx and the radar reception unit Rx. The reference signal generation unit Lo supplies a common reference signal to the radar transmission unit Tx and the radar reception unit Rx, making processing synchronized between the radar transmission unit Tx and the radar reception unit Rx.

The radar reception unit Rx includes, for example, four antenna system processing units D1, D2, D3, D4, a Doppler frequency-azimuth conversion unit 22, and a stationary object azimuth estimation unit 23. The radar reception unit Rx shown in FIG. 1 has four antenna system processing units D1 to D4 in correspondence to the number of receive antennas, for example; however the number of antenna system processing units is not limited to four. The radar reception unit Rx may also comprise at least two antenna system processing units by selection of received reflected waves. As the antenna system processing units D1 to D4 have similar configurations, the antenna system processing unit D1 will be described as an example in the following embodiments.

The antenna system processing unit D1 includes a delay time measurement unit 12 which is connected with the receive antenna Rx_ant1, and a Doppler frequency analysis unit 20.

Next, the operations of the components of the radar transmission unit Tx and radar reception unit Rx shown in FIG. 2 will be described in detail.

The transmission signal generation unit 2 generates a transmission reference clock signal by multiplying the reference signal generated in the reference signal generation unit Lo by a predetermined factor. The components in the transmission signal generation unit 2 operate in accordance with the transmission reference clock signal.

The transmission signal in the baseband generated by the transmission signal generation unit 2 may be, for example, a coded pulse as shown in FIG. 4A or a chirp pulse as shown in FIG. 10A, and is repeatedly transmitted in at intervals of a predetermined transmit period.

The transmission radio unit 3 upconverts the transmission signal generated by the transmission signal generation unit 2 to generate a radar transmission signal in a carrier frequency band (a millimeter wave band for example).

The transmit antenna Tx-ant1 radiates the radar transmission signal generated by the transmission radio unit 3 into space.

The receive antenna Rx_ant1 receives a reflected wave signal resulting from the radar transmission signal transmitted from the radar transmission unit Tx being reflected off a stationary object or a moving object. The high-frequency radar received signal received by the receive antenna Rx_ant1 is input to the delay time measurement unit 12.

The delay time measurement unit 12 computes the correlation between the received signal input from the receive antenna Rx_ant and the transmitted signal for each transmit period. By computation of the correlation, the delay time measurement unit 12 varies the reception delay time of reflected wave signals from the stationary object or moving object, namely the delay time from the start of transmission of the radar transmission signal, and measures the computed correlation value (a value with a complex component) for each of the varying delay times.

The output of the computed correlation value from the delay time measurement unit 12 for each delay time is obtained at intervals of the transmit period or an integer multiple of the transmit period.

The Doppler frequency analysis unit 20 multiplies the computed correlation value for each delay time output from the delay time measurement unit 12 by correction factors for phase variations corresponding to multiple Doppler frequencies $f_s\Delta\theta$ and applies a coherent addition process. The Doppler frequency analysis unit 20 accordingly outputs the result of coherent addition of multiple Doppler frequency components for each delay time.

The Doppler frequency analysis unit 20 determines the magnitudes of the values of Doppler frequencies $f_s\Delta\theta$ included in the computed correlation value based on the result of coherent addition of Doppler frequency components. The correction factors for phase variations corresponding to the multiple Doppler frequencies $f_s\Delta\theta$ are preset in the radar apparatus 1 based on the expected maximum Doppler frequency and a desired Doppler frequency interval.

The Doppler frequency-azimuth conversion unit 22 converts the Doppler frequency components from the target into components of the azimuth angle (azimuth components) $\phi(f_s)$ in which the target is present using an estimated vehicle speed vector (Vs [m/s], Ψ [rad/s], see the following description) for the vehicle CR on the assumption that a target that has Doppler frequency components corresponding to the Doppler frequencies $f_s\Delta\theta$ used in the Doppler frequency analysis unit 20 is a stationary object, and outputs the converted azimuth angle $\phi(f_s)$ to the stationary object azimuth estimation unit 23. That is, since the azimuth angle converted from Doppler frequencies varies as a function of the estimated vehicle speed vector of the vehicle CR, the Doppler frequency-azimuth conversion unit 22 outputs an azimuth angle converted from Doppler frequencies on the basis of the estimated vehicle speed vector of the vehicle CR.

The Doppler frequencies $f_s\Delta\theta$ are preset in the radar apparatus 1 on the basis of the expected maximum Doppler frequency and a desired Doppler frequency interval.

Here, $f_s$ includes 0 and is from $-Nf+1$ to $Nf-1$. Nf is an integer greater than 1; and $\Delta\theta$ is a parameter for adjusting the range of Doppler frequency components to be detected, being a value indicative of a phase rotation unit (a predetermined value) preset in accordance with the range of the Doppler frequency components of stationary or moving objects intended as the target.

The stationary object azimuth estimation unit 23 receives input of the coherent addition result for each of the multiple Doppler frequency components for each delay time and derives a correlation vector h. The results of coherent addition are provided from the antenna system processing units D1 to D4 at intervals of the transmit period or an integer multiple of the transmit period. The stationary object azimuth estimation unit 23 also receives input of information on the azimuth angle corresponding to the Doppler frequencies from the Doppler frequency-azimuth conversion unit 22.

In a case where the correlation vector h satisfies predetermined conditions, the stationary object azimuth estimation unit 23 determines a power profile $F_{out}$ for each distance-azimuth-Doppler frequency component for the reflected wave signals from the stationary object based on computation of the correlation between the correlation vector h and a direction vector "a" representing the complex response of each receive antenna for each of the azimuth angles in which radio waves arrive. The direction vector "a" is prestored and represented by a column vector having as many elements as the number of receive antennas.

In a case where the correlation vector h does not satisfy the predetermined conditional expression, the stationary object azimuth estimation unit 23 may set the power profile $F_{out}$ for each distance-azimuth-Doppler frequency component to 0 (zero) or a certain value or symbol indicating that the predetermined conditional expression is not satisfied.

Next, the configurations of the components of the radar transmission unit Tx will be described in detail with reference to FIG. 3. The radar transmission unit Tx shown in FIG. 3 includes a transmission signal generation unit 2, and a transmission radio unit 3 connected with transmit antenna Tx_ant1.

The transmission signal generation unit 2 includes a code generation unit 4, a modulation unit 5, a low pass filter (LPF) 6, and a digital-to-analog (D/A) conversion unit 7. In FIG. 3, the LPF 6 may be provided outside the transmission signal generation unit 2 and the output of the LPF 6 is input to the D/A conversion unit 7. The transmission radio unit 3 includes a frequency conversion unit 8 and an amplifier 9.

An example in which the transmission signal generation unit 2 uses a coded pulse is now described.

The coded pulse shown in FIG. 4A will be described first. In the transmission slot Tw (seconds) in the transmit period Tr for example, each code in a code sequence $C_n$ having a code length L is modulated using No (number of) samples of the transmission reference clock signal, where n is 1 to L. L (an integer greater than 0) represents the code length of the code sequence $C_n$.

The sampling rate of the transmission signal generation unit 2 is (No×L)/Tw, and the transmission signal generation unit 2 performs modulation using Nr(=No×L) samples in the transmission slot Tw (seconds) of the transmit period Tr. The transmission signal generation unit 2 performs modulation using Nu samples in the no-signal period (Tr−Tw) (seconds) of the transmit period Tr.

The transmission signal generation unit 2 periodically generates the transmission signal r(k, M) in the baseband shown in Equation (1) by modulating the code sequence $C_n$ of code length L. Here, j is an imaginary unit satisfying $j_2=-1$. Time k is a discrete time referenced to the timing at which the transmit period Tr starts (k=1), k being a discrete value from 1 to (Nr+Nu) and being a time representing the timing at which the transmission signal is generated (sampling timing).

M represents the ordinal number of the transmit period Tr of the radar transmission signal. The transmission signal r(k, M) represents the transmission signal at discrete time k in the M-th transmit period Tr, and is expressed by an in-phase signal component I(k, M) and a quadrature signal component Q(k, M) multiplied by the imaginary unit j (see Equation (1)).

$$r(k,M)=I(k,M)+jQ(k,M) \tag{1}$$

The code generation unit 4 generates transmission codes for the code sequence $C_n$ of code length L in each transmit period Tr. The elements of the code sequence $C_n$ may be composed of two values [−1, 1] or four values [1, −1, j, −j], for example. In order that reflected wave signals received by the radar reception unit Rx have low side lobe properties, the transmission code is preferably a code comprising at least one of a code sequence that forms complementary code pairs, a Barker code sequence, a pseudorandom noise (PN) code, a Golay code sequence, an M-sequence code, and a code sequence forming Spano codes, for example. The code generation unit 4 outputs the transmission codes of the code sequence $C_n$ generated to the modulation unit 5. Hereinafter, the transmission codes of the code sequence $C_n$ will be denoted as transmission code $C_n$ for the sake of convenience.

For creating a pair of complementary codes (for example, Golay code sequence or Spano code sequence) as the transmission codes $C_n$, the code generation unit 4 uses two transmit periods (2Tr) to alternately generate transmission codes $P_n$, $Q_n$ to form a pair in the respective transmit periods. More specifically, the code generation unit 4 generates one of the transmission codes, $P_n$, to form a complementary code pair and outputs it to the modulation unit 5 in the M-th transmit period, and generates the other transmission code $Q_n$ to form the complementary code pair and outputs it to the modulation unit 5 in the following (M+1)-th transmit period. In the (M+2)-th and subsequent transmit periods, the code generation unit 4 similarly repeats the generation of the transmission codes $P_n$, $Q_n$ using two transmit periods, the M-th and (M+1)-th transmit periods, as a unit and outputs them to the modulation unit 5.

The modulation unit 5 pulse-modulates the transmission codes $C_n$ generated by the code generation unit 4 to generate the transmission signal r(k, M) in the baseband shown in Equation (1). The pulse modulation may be amplitude modulation (amplitude shift keying (ASK)) or phase modulation (phase shift keying (PSK)), which also applies to the embodiments described below.

For phase modulation (PSK) for example, binary phase shift keying (BPSK) is employed for phase modulation of a code sequence $C_n$ with two values, for example, [−1, 1], and quadrature phase shift keying (QPSK) is employed for phase modulation of a code sequence $C_n$ with four values, for example, [1, −1, j, −j]. That is, in phase modulation (PSK), predetermined modulation symbols in a constellation on an IQ plane are assigned.

The modulation unit 5 outputs transmission signal r(k, M) below a predefined band limit among the transmission signals r(k, M) to the D/A conversion unit 7 via the LPF 6. The LPF 6 may be omitted in the transmission signal generation unit 2 and provided downstream of the D/A conversion unit 7; this also applies to the embodiments described below.

The D/A conversion unit 7 converts the digital transmission signal r(k, M) generated by the modulation unit 5 into an analog transmission signals. The D/A conversion unit 7 outputs the analog transmission signal to the transmission radio unit 3.

The transmission radio unit 3 generates a transmission reference signal in the carrier frequency band by multiplying the reference signal generated by the reference signal generation unit Lo by a predetermined factor. In multiplying the reference signal, the transmission signal generation unit 2 and the transmission radio unit 3 may either apply different factors or the same factor. The components of the transmission radio unit 3 operate in accordance with the transmission reference signal.

The frequency conversion unit 8 upconverts the transmission signal r(k, M) generated by the transmission signal generation unit 2 to generate a radar transmission signal in the carrier frequency band (a millimeter wave band, for example). The frequency conversion unit 8 outputs the radar transmission signal to the amplifier 9.

The amplifier 9 amplifies the signal level of the radar transmission signal generated by the frequency conversion unit 8 to a predetermined signal level and outputs it to the transmit antenna Ant-Tx. The radar transmission signal amplified by the amplifier 9 is radiated into space via the transmit antenna Ant-Tx.

The transmit antenna Ant-Tx radiates the radar transmission signal generated by the transmission radio unit 3 into space. The radar transmission signal is transmitted during the transmission slot Tw in the transmit period Tr and is not transmitted during the non-transmission slot (Tr−Tw) (see FIG. 4A).

To the transmission radio unit 3 and the delay time measurement units 12 of the antenna system processing units D1 to D4, the reference signal generated by the reference signal generation unit Lo is input in common. The transmission radio unit 3 operates in accordance with the transmission reference signal which is the reference signal multiplied by a predetermined factor, and the delay time measurement units 12 of the antenna system processing units D1 to D4 operate in accordance with a reception reference signal which is the reference signal multiplied by the same factor as used in the transmission radio unit 3. This makes processing synchronized between the transmission radio unit 3 and the delay time measurement units 12 of the respective antenna system processing units D1 to D4.

The transmission signal generation unit 2 may also be configured as a transmission signal generation unit 2r which does not include the code generation unit 4, modulation unit 5, and LPF 6, and has a transmission code memory unit CM in which transmission codes $C_n$ generated by the transmission signal generation unit 2 are prestored (see FIG. 4B).

The transmission code memory unit CM may also store complementary code pairs, for example, transmission codes $P_n$ and $Q_n$, for the transmission signal generation unit 2 to generate transmission codes to form complementary code pairs. The configuration of the transmission signal generation unit 2r shown in FIG. 4B is also applicable in the embodiments discussed below in addition to the first embodiment. The transmission signal generation unit 2r has the transmission code memory unit CM and a D/A conversion unit 7.

The transmission code memory unit CM cyclically reads transmission codes $C_n$ or transmission codes $P_n$, $Q_n$ forming complementary code pairs from the transmission code memory unit CM and outputs them to the D/A conversion unit 7 in each transmit period Tr in accordance with the transmission reference clock signal, which is the reference signal generated by reference signal generation unit Lo multiplied by a predetermined factor. As the following operation is similar to that of the D/A conversion unit 7 described above, the description thereof is omitted.

The configurations of the components of the radar reception unit Rx are described next with reference to FIG. 3.

The radar reception unit Rx shown in FIG. 3 includes four antenna system processing units D1 to D4 provided in correspondence to the number of receive antennas constituting the array antenna (four in FIG. 2, for example), a vehicle travel status estimation unit 21, a Doppler frequency-azimuth conversion unit 22, a stationary object azimuth estimation unit 23, a moving object azimuth estimation unit 24, a stationary object detection unit 25, and a moving object detection unit 26.

The antenna system processing unit D1 has a delay time measurement unit 12 connected with the receive antenna Rx_ant1, and a Doppler frequency analysis unit 20. The delay time measurement unit 12 includes an amplifier 13, a frequency conversion unit 14, a quadrature detection unit 15, two A/D conversion units 16, 17, a correlation computation unit 18, and a coherent addition unit 19. The radar reception unit Rx periodically computes each transmit period Tr of the radar transmission signal as the signal processing period for the delay time measurement units 12 of the antenna system processing units D1 to D4.

Figure 5:
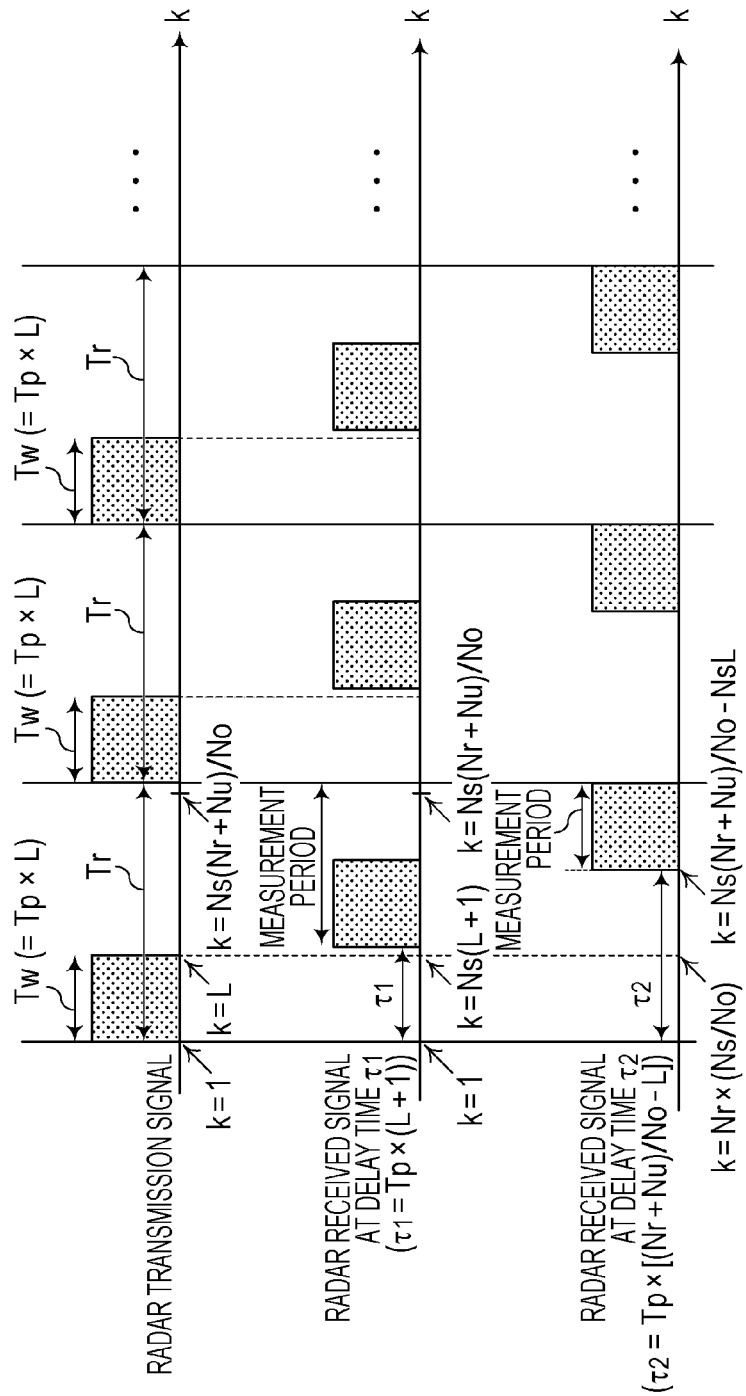
FIG. 5 shows the relationship among the radar transmission signal, a radar received signal at delay time $\tau_1$, and a radar received signal at delay time $\tau_2$.
Figure 6:
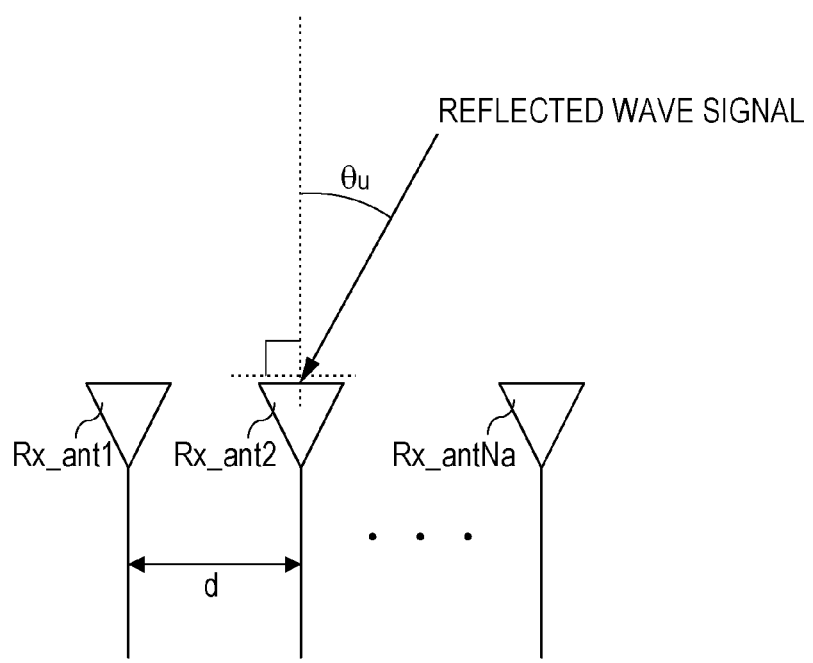
FIG. 6 illustrates the relationship between positioning of the receive antenna elements constituting an array antenna and the azimuth angle $\theta_u$.

Next, the operations of the components of the radar reception unit Rx will be described in detail with reference to FIGS. 3, 5, and 6. FIG. 5 shows the relationship among the radar transmission signal, the radar received signal at delay time $\tau_1$, and the radar received signal at delay time $\tau_2$. FIG. 6 illustrates the relationship between positioning of the receive antennas Rx_ant1 to Rx_ant4 constituting the array antenna and the azimuth angle $\theta_u$.

The receive antenna Rx_ant1 receives a reflected wave signal resulting from a radar transmission signal transmitted by the radar transmission unit Tx being reflected by an object. The high-frequency radar received signal received by the receive antenna Rx_ant1 is input to the delay time measurement unit 12.

As with the transmission radio unit 3, the delay time measurement unit 12 generates a reception reference signal in the carrier frequency band by multiplying the reference signal generated by the reference signal generation unit Lo by a predetermined factor. The components of the delay time measurement unit 12 operate in accordance with the reception reference signal.

The amplifier 13 amplifies the signal level of the radar received signal received by the receive antenna Rx_ant1 to a predetermined signal level and outputs it to the frequency conversion unit 14.

The frequency conversion unit 14 uses the radar received signal amplified by the amplifier 13 and the reception reference signal to downconvert the radar received signal in a high frequency band to the baseband, thereby generating a received signal in the baseband. The frequency conversion unit 14 outputs the baseband received signal to the quadrature detection unit 15.

The quadrature detection unit 15 performs quadrature detection on the baseband received signal generated by the frequency conversion unit 14 to generate a received signal composed of an in-phase signal and a quadrature signal. Of the baseband received signal, the quadrature detection unit 15 outputs the in-phase signal to the A/D conversion unit 16 and the quadrature signal to the A/D conversion unit 17.

The A/D conversion unit 16 samples the baseband in-phase signal generated by the quadrature detection unit 15 every discrete time k and converts the in-phase signal as analog data into digital data. The A/D conversion unit 16 outputs the in-phase signal component as digital data to the correlation computation unit 18.

The A/D conversion unit 16 takes Ns samples per pulse width (pulse time) Tp(=Tw/L) of the transmission signal r(k, M) generated by the radar transmission unit Tx. The sampling rate in the A/D conversion unit 16 is therefore (Ns× L)/Tw=Ns/Tp, and the number of oversamplings per pulse is Ns.

The A/D conversion unit 17 operates on the baseband quadrature signal generated by the quadrature detection unit 15 in a similar manner to the A/D conversion unit 16 and outputs the quadrature signal component as digital data to the correlation computation unit 18. The sampling rate in the A/D conversion unit 17 is Ns/Tp and the number of oversamplings per pulse is Ns.

Hereinbelow, the baseband received signal at discrete time k in the M-th transmit period Tr as the output from the A/D conversion units 16, 17 will be represented as a complex signal x(k, M) as shown in Equation (2) using the in-phase signal component Ir(k, M) and the quadrature signal component Qr(k, M).

$$x(k,M)=Ir(k,M)+jQr(k,M) \qquad (2)$$

The timing chart shown in the uppermost portion in FIG. 5 represents the transmission timing of the radar transmission signal. The delay time measurement unit 12 periodically operates regarding the period from discrete time k=1, namely the timing at which each transmit period Tr starts, to k=Ns(Nr+Nu)/No which is a sampling timing before the end of the transmit period Tr in the timing chart shown in the uppermost portion in FIG. 5 as the signal processing period. In short, the delay time measurement unit 12 periodically operates from discrete time k=1 to k=Ns(Nr+Nu)/No.

The timing chart shown in the middle portion in FIG. 5 represents the reception timing of the radar received signal at delay time $\tau_1$. The timing chart shown in the bottom in FIG. 5 represents the reception timing of the radar received signal at delay time $\tau_2$. Discrete time k=Nr×(Ns/No) indicates a point in time immediately before the end of the transmission slot Tw in one transmit period Tr. Hereinbelow, the digital received signal x(k, M) as the output of the A/D conversion units 16, 17 will be referred to as a discrete sampled value x(k, M).

The correlation computation unit 18 periodically generates a transmission code $C_n$ of code length L at each discrete time k based on the reception reference clock signal, which is the reference signal generated by the reference signal generation unit Lo multiplied by a predetermined factor. The value n is an integer from 1 to L, L representing the code length of the code sequence $C_n$.

The correlation computation unit 18 calculates a sliding correlation value AC(k, M) between the discrete sampled value Ir(k, M), Qr(k, M) as the outputs from the A/D conversion units 16, 17, namely a discrete sampled value x(k, M) indicating the received signal, and the transmission code $C_n$, and measures the delay time $\tau$ from the start of transmission of the radar transmission signal. AC(k, M) represents the sliding correlation value at discrete time k in the M-th transmit period.

More specifically, the correlation computation unit 18 calculates the sliding correlation value AC(k, M) by Equation (3) for each transmit period Tr shown in the timing chart in the middle portion in FIG. 5, namely each discrete time k (k being 1 to Ns(Nr+Nu)/No). The correlation computation unit 18 outputs the sliding correlation value AC(k, M) at each discrete time k calculated by Equation (3) to the coherent addition unit 19. The "*" (asterisk) in Equation (3) represents a complex conjugate operator.

$$AC(k, M) = \sum_{n=1}^{L} x(k + Ns(n-1), M)C_n^* \qquad (3)$$

The timing chart in the middle portion in FIG. 5 shows the measurement period range over which measurement is performed in the radar reception unit Rx when receiving the radar received signal after elapse of delay time $\tau_1$ from the start of transmission of the radar transmission signal. The timing chart in the bottom in FIG. 5 shows the measurement period range over which measurement is performed in the radar reception unit Rx when receiving the radar received signal after elapse of delay time $\tau_2$ from the start of transmission of the radar transmission signal. The delay times $\tau_1$ and $\tau_2$ are represented by Equations (4) and (5), respectively:

$$\tau_1 = Tp \times (L+1) \qquad (4)$$

$$\tau_2 = Tp \times \left\{ \frac{(Nr + Nu)}{No} - L \right\} \qquad (5)$$

The correlation computation unit 18 may limit the measurement range, namely the range of discrete time k representing the range over which the sliding correlation value AC(k, m) is calculated, as a function of the range in which objects to be measured by the radar apparatus 1 can be present. This enables the radar apparatus 1 to reduce the amount of computation performed in the correlation computation unit 18, and a reduction in the amount of computation in the delay time measurement unit 12 can in turn decrease the power consumption in the radar reception unit Rx.

The radar apparatus 1 may exclude the transmission slot Tw in the transmit period Tr of the radar transmission signal from the measurement period when the correlation computation unit 18 computes the sliding correlation value AC(k, m) in the range from Ns(L+1) to Ns(Nr+Nu)/No−NsL as discrete times k.

In the radar apparatus 1, the radar transmission signal is input to the radar reception unit Rx as a direct wave; that is, measurement can be carried out without being affected by leakage of the radar transmission signal. When the measurement range (the range of discrete time k) is limited, the coherent addition unit 19, Doppler frequency analysis unit 20, stationary object azimuth estimation unit 23, moving object azimuth estimation unit 24, stationary object detection unit 25, and moving object detection unit 26 also operate over a similarly limited measurement range, so that the amount of processing performed in these units can be reduced, enabling a further reduction in power consumption of the radar reception unit Rx.

The coherent addition unit 19 as an example of a first coherent addition unit performs coherent addition (in-phase addition) of sliding correlation values AC(k, M) for the duration of a predetermined number (Np) of transmit periods Tr (Np×Tr) on the basis of the sliding correlation value AC(k, M) calculated by the correlation computation unit 18 at each discrete time k in the M-th transmit period Tr.

More specifically, the coherent addition unit 19 adds sliding correlation values AC(k, M) for the duration of the predetermined number (Np) of transmit periods Tr (Np×Tr) for each discrete time k, thereby calculating a coherent addition value CI(k, m) at each discrete time k in the m-th Np transmit periods Tr by Equation (6) below. Np is a predetermined value representing the number of additions performed by the coherent addition unit 19. The value m represents the ordinal number of the coherent addition output from the coherent addition unit 19 of each antenna system processing unit on each execution of coherent additions the number of times Np. For example, m=1 represents the first coherent addition output from the coherent addition unit 19. The coherent addition unit 19 outputs the coherent addition value CI(k, m) to the Doppler frequency analysis unit 20. In Equation (6), the discrete time k may be replaced with delay time τ.

$$CI(k, m) = \sum_{g=1}^{Np} AC(k, Np(m-1) + g) \quad (6)$$

By adding sliding correlation values AC(k, M) Np times, the coherent addition unit 19 can suppress noise components included in reflected wave signals through addition processing including phase in a time period in which reflected wave signals from the object have high correlation, improving the reception quality (SNR) of reflected wave signals. Furthermore, the improvement in the reception quality of the reflected wave signals in the coherent addition unit 19 can enhance the accuracy of estimation of the direction in which a reflected wave signal from the object arrives.

For obtaining an ideal addition gain, it is necessary that the phase components of sliding correlation values AC(k, M) fall in the same range to some extent in the period in which sliding correlation values AC(k, M) are added Np times. In other words, since movement of the object produces an associated phase variation, the number of additions Np is preferably established on the basis of the expected maximum travel speed of the object.

For a larger expected maximum travel speed of the object, the amount of variations in Doppler frequencies included in reflected wave signals from the object becomes larger and the interval between discrete times having a high correlation value becomes shorter. As a result, the number of additions Np decreases and the effect of improvement in the coherent addition gain in the coherent addition unit 19 becomes low.

In embodiments of the present disclosure including the first embodiment, provision of the coherent addition unit 19 upstream of the Doppler frequency analysis unit 20 realizes the effect of reduction in the number of additions performed in the Doppler frequency analysis unit 20; however, the coherent addition unit 19 may be omitted. While the following descriptions of embodiments including the first embodiment illustrate operations using a configuration including the coherent addition unit 19, the advantageous effects of the radar apparatus 1 according to this embodiment could be attained without the coherent addition unit 19. In an implementation without the coherent addition unit 19, operation is performed with the number of coherent additions Np=1; the following description is otherwise not affected and similar effects could be obtained.

The Doppler frequency analysis unit 20 as an example of a second coherent addition unit performs coherent addition by using predefined phase variations ε(f$_s$) (see Equation (7)) corresponding to 2Nf different Doppler frequencies f$_s$Δθ as correction factors in units of coherent addition results from CI(k, Nc(w−1)+1) to CI(k, Nc×w), which are Nc outputs from the coherent addition unit 19 obtained for each discrete time k (see Equation (8)). That is, the Doppler frequency analysis unit 20 multiplies a received signal with unknown phase variation by the predefined correction factors and determines a correction factor which produces a high value to be the phase variation of the received signal. The coherent addition unit 19 also outputs the received signal.

The Doppler frequency analysis unit 20 outputs the results of Nc coherent additions to the stationary object azimuth estimation unit 23 and the moving object azimuth estimation unit 24. Here, Δθ is a parameter for adjusting the range of Doppler frequency components to be detected, being a value indicative of a phase rotation unit (a predetermined value) preset in accordance with the range of the Doppler frequency components for a stationary object or moving object expected as the target.

$$\varepsilon(f_s) = 2\pi f_s (Tr \times Np)\Delta\theta \quad (7)$$

$$FT\_CI^{Nant}(k, f_s, w) = \sum_{q=1}^{Nc} CI^{Nant}(k, Nc(w-1) + q)\exp[-jq\varepsilon(f_s)]$$
$$= \sum_{q=1}^{Nc} CI^{Nant}(k, Nc(w-1) + q)\exp[-jq2\pi f_s TrNp)] \quad (8)$$

The calculation shown in Equation (8) is equivalent to processing that performs discrete Fourier transform of the output of the coherent addition unit 19 with sampling interval Tm=(Tr×Np) and sampling frequency fm=1/Tm. The value w is an integer greater than zero, representing the number of times the transmit period Tr is iterated in blocks of Np×Nc. For example, w=1 represents a total of Np×Nc transmit periods Tr, from the first transmit period Tr to the (Np×Nc)-th transmit period Tr. In other words, the Doppler frequency analysis unit 20 outputs the result of coherent addition shown in Equation (8) to the stationary object azimuth estimation unit 23 and the moving object azimuth estimation unit 24 each time transmit period Tr is repeated Np×Nc times.

In Equation (8), Nant represents the ordinal (number) of the antenna system processing unit, namely from 1 to Na (a constant); for example, Na=4 in the case of the radar reception unit Rx shown in FIG. 3. Also in Equation (8), the exponential function portion (exp component) represents the amount of cancellation of phase variations corresponding to the 2Nf different Doppler frequencies $f_s\Delta\theta$ for canceling out the phase variations $\epsilon(f_s)$ generated in reflected wave signals in response to movement of the object. The value q is an integer from 1 to Nc, representing the range of the number of times coherent addition is performed in the Doppler frequency analysis unit 20.

$FT\_CI_{Nant}(k, f_s, w)$ represents the w-th output of the Doppler frequency analysis unit 20, indicating the result of coherent additions based on the Doppler frequencies $f_s\Delta\theta$ at discrete time k in the Nant-th antenna system processing unit. The value of k is from 1 to $((Nr+Nu)\times Ns/No)$. The value $f_s$ includes 0, being from $-Nf+1$ to Nf. The value j is an imaginary unit.

By calculation of Equation (8), each of the antenna system processing units D1 to D4 obtains $FT\_CI_{Nant}(k, -Nf+1, w)$ to $FT\_CI_{Nant}(k, Nf, w)$ as the results of coherent addition based on the 2Nf Doppler frequencies $f_s\Delta\theta$ at each discrete time k, for each duration of $Np\times Nc$ transmit periods Tr ($Tr\times Np\times Nc$).

When Nf>Nc, by setting Nf to a power of 2 ($2^n$, n being an integer) for a range in which q>Nc by employing zero padding such that $CI(k, Nc(w-1)+q)=0$, it becomes possible to apply fast Fourier transform (FFT) to the calculation shown in Equation (8) so that the amount of calculation performed in the radar apparatus 1 can be reduced. Instead of using fast Fourier transform, the Doppler frequency analysis unit 20 may sequentially perform the calculation process shown in Equation (8) (for example, $CI(k, Nc(w-1)+q)$) which are Nc outputs from the coherent addition unit 19 obtained for each discrete time k) after generating the coefficient $\exp[-jq2\pi f_s TrNp]$. The value $f_s$ includes 0 and is from $-Nf+1$ to Nf; and q is from 1 to Nc.

$FT\_CI_1(k, f_s, w)$ to $FT\_CI_{Na}(k, f_s, w)$, which are the outputs of the Doppler frequency analysis units of the antenna system processing units D1 to D4, are input to the stationary object azimuth estimation unit 23 and the moving object azimuth estimation unit 24 as correlation vectors $h(k, f_s, w)$ (see Equation (9)).

$$h(k, f_s, w) = \begin{bmatrix} FT\_CI^1(k, f_s, w) \\ FT\_CI^2(k, f_s, w) \\ \vdots \\ FT\_CI^{Na}(k, f_s, w) \end{bmatrix} \quad (9)$$

Instead of the correlation vector $h(k, f_s, w)$ shown in Equation (9), a correlation vector $h(k, f_s, w)$ which is referenced to the antenna system processing unit of one of the antenna system processing units D1 to D4 may be input to the stationary object azimuth estimation unit 23 and the moving object azimuth estimation unit 24 (see Equation (10)). In Equation (10), the superscript asterisk (*) represents a complex conjugate operator.

$$h(k, f_s, w) = \begin{bmatrix} FT\_CI^1(k, f_s, w) \\ FT\_CI^2(k, f_s, w) \\ \vdots \\ FT\_CI^{Na}(k, f_s, w) \end{bmatrix} FT\_CI^1(k, f_s, w)^* \quad (10)$$

The vehicle travel status estimation unit 21 calculates the estimated vehicle speed vector (Vs, Ψ) as movement information, using output values from a vehicle sensor (not shown, for example, a vehicle speed sensor, a rudder angle sensor, or a yaw rate sensor) installed in the vehicle CR and outputs it to the Doppler frequency-azimuth conversion unit 22. Vs represents the components of velocity in the front direction of the vehicle CR, and Ψ is the amount of rotation indicating the status of curved line travel of the vehicle CR. A method for calculating the estimated vehicle speed vector (Vs, Ψ) from a vehicle sensor mounted in the vehicle CR can be found in Japanese Unexamined Patent Application Publication No. 2004-177289, for instance.

The Doppler frequency-azimuth conversion unit 22 converts the Doppler frequencies $f_s\Delta\theta$ used in the Doppler frequency analysis unit 20 into the components of the azimuth angle in which the stationary object is present (azimuth components) $\phi(f_s)$ using the estimated vehicle speed vector (Vs [m/s], Ψ [rad/s]) of the vehicle CR (see the following description) by Equation (11). The value $f_s$ includes 0 and is from $-Nf+1$ to $Nf-1$. Nf is an integer greater than 1. The Doppler frequency-azimuth conversion unit 22 outputs the azimuth angle $\phi(f_s)$ in which the stationary object is present. In Equation (11), λ is the wavelength of the radar transmission signal transmitted from the transmit antenna Tx-ant1. In other words, the Doppler frequency-azimuth conversion unit 22 selects Doppler frequencies $f_s\Delta\theta$ in accordance with the estimated vehicle speed vector (Vs [m/s], Ψ [rad/s]) of the vehicle CR and converts them to the components of the azimuth angle (azimuth components) $\phi(f_s)$ in which the stationary object is positioned.

$$\phi(f_s) = \arcsin\left[\frac{v_d(f_s)}{v_s}\right] + \Psi + \gamma = \arcsin\left[\frac{\lambda f_s \Delta\theta}{2v_s}\right] + \Psi + \gamma \quad (11)$$

In FIG. 1, the radar apparatuses 1L, 1R are preferably disposed so that their azimuth angle measurement ranges cover ±45° or ±135° directions relative to the front direction FR of the vehicle CR.

The installation angle ±45° or ±135° is described. From Equation (11), in a situation in which the vehicle is traveling straight (Ψ=0), and the installation angle γ is 0, and the difference in the azimuth angles of two stationary objects is η [rad] (for example, azimuth angles θ [rad] and θ+η [rad]), the absolute value $|\Delta fd(\theta, \theta+\eta)|$ of the difference of Doppler frequencies detected can be represented as Equation (12). By Equation (11), when θ is ±π/4 or ±3π/4, (i.e., ±45° or)±135°, Equation (12) becomes a term concerning η, so it makes a condition under which the difference in the azimuth angles of reflected wave signals (the directions in which they arrive) can be detected as a difference in Doppler frequencies most easily.

Put differently, by setting the radar apparatuses 1L, 1R so that their azimuth angle measurement ranges cover ±45° or ±135° directions relative to the front direction FR of the vehicle CR, it becomes easy to separate objects present at close azimuth angles on the basis of Doppler frequencies, improving the performance of reflected wave signal separation.

$$|\Delta f_d(\theta, \theta+\eta)| = \left|\frac{v_s}{\lambda}[\cos(2\theta) - \cos 2(\theta+\eta)]\right| \quad (12)$$

The stationary object azimuth estimation unit 23 determines whether the correlation vector $h(k, f_s, w)$ obtained from each of the antenna system processing units D1 to D4 in the w-th Np×Nc transmit periods Tr satisfies the conditional expression shown in Equation (13), which uses a threshold value const1 and a threshold value const2.

The threshold values const1 and const2 are predetermined real values; the threshold value const1 is a prescribed value exceeding the noise level, and the threshold value const2 is a prescribed value falling in a range of greater than 0 and less than 1.

As the threshold value const2 is closer to 1, the stationary object azimuth estimation unit 23 selects a reflected wave having a higher correlation (correlation coefficient value) based on the correlation (correlation coefficient value) between the direction vector $a(\theta_u(f_s))$ and the correlation vector $h(k, f_s, w)$. The descriptions of the threshold value const1 and threshold value const2 also apply to the embodiments discussed below.

When the correlation vector $h(k, f_s, w)$ is determined to satisfy the conditional expression using the threshold values const1 and const2 shown in Equation (13), the stationary object azimuth estimation unit 23 performs squaring calculation of the inner product of the correlation vector $h(k, f_s, w)$ and a prestored direction vector $a(\theta_u(f_s))$, and determines the power profile $F_{out}(k, f_s, \theta_u, w)$ for each distance-azimuth-Doppler frequency component in the reflected wave signals reflected back from the stationary object by Equation (13).

The squaring calculation of the inner product of the correlation vector $h(k, f_s, w)$ and the prestored direction vector $a(\theta_u(f_s))$ may instead be calculation of the absolute value of the inner product.

The direction vector $a(\theta_u(f_s))$ used by the stationary object azimuth estimation unit 23 is a direction vector included in the angle range $[\phi(f_s)-BW, \phi(f_s)+BW]$ in which stationary objects are present. That is, the azimuth angle $\theta_u(f_s)$ that determines the direction vector $a(\theta_u(f_s))$ varies in the range $\phi(f_s)-BW \leq \theta_u(f_s) \leq \phi(f_s)+BW$ as a function of Doppler frequencies $f_s \Delta \theta$.

The angle range $[\phi(f_s) \; \phi(f_s)+BW]$ in which stationary objects are present is set taking into consideration an error included in the estimated vehicle speed vector calculated by the vehicle travel status estimation unit 21. The azimuth angle estimation range BW may either be a fixed value or vary as a function of an error associated with the speed of the vehicle CR (high speed or low speed, for example).

Figure 8:
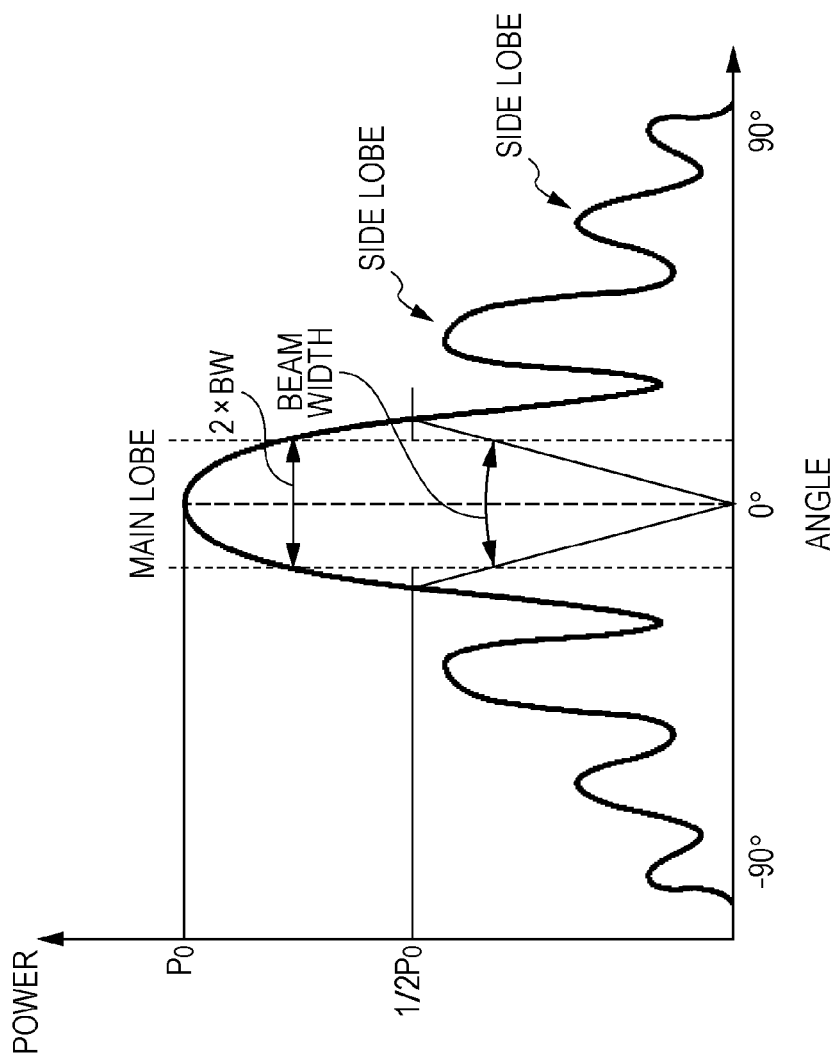
FIG. 8 is a diagram illustrating the relationship between the directivity of the array antenna of the radar apparatus according to the first embodiment and the measurement range.

Also, incorrect estimations of a stationary object caused by a side lobe and a grating lobe in the reflected wave signal can be reduced by using a value equal to or less than about half the beam width of the main lobe in the reflected wave signal received by the array antenna in the stationary object azimuth estimation unit 23 as the angle range $[\phi(f_s)-BW, \phi(f_s)+BW]$ in which stationary objects are present (see FIG. 8). FIG. 8 is a diagram illustrating the relationship between the directivity of the array antenna of the radar apparatus according to the first embodiment and the measurement range.

When the correlation vector $h(k, f_s, w)$ is determined not to satisfy the conditional expression using the threshold values const1 and const2 shown in Equation (13), the stationary object azimuth estimation unit 23 determines the power profile $F_{out}(k, f_s, \theta_u, w)$ for each distance-azimuth-Doppler frequency component to be 0 (zero). The power profile $F_{out}(k, f_s, \theta_u, w)$ for each distance-azimuth-Doppler frequency component may also be a prescribed value sufficiently smaller than the level of reflected wave signals from the stationary object, for example, a sufficiently small value equivalent to the noise level, or a predetermined value or symbol indicating that the predetermined conditional expression is not satisfied. The stationary object azimuth estimation unit 23 outputs the power profile $F_{out}(k, f_s, \theta_u, w)$ for each distance-azimuth-Doppler frequency component to the stationary object detection unit 25.

if $h(k,f_s,w)^H h(k,f_s,w) > \text{const1}$ and $|a(\theta_u(f_s))^H h(k,f_s,w)|^2 / a(\theta_u(f_s))^H a(\theta_u(f_s)) > \text{const2} \times h(k,f_s,w)^H h(k,f_s,w)$ then $F_{out}(k,f_s,\theta_u,w) = |a(\theta_u(f_s))^H h(k,f_s,w)|^2$ else $F_{out}(k,f_s,\theta_u,w) = 0$ \hfill (13)

Here, the direction vector $a(\theta_u(f_s))$ is an Na-th-order column vector representing the complex response of each receive antenna to the reflected wave signal from the stationary object, and the components of the direction in which reflected wave signals from the stationary object arrive represent the azimuth angle $\theta_u(f_s)$. The direction vector $a(\theta_u(f_s))$, which represents the complex response of each receive antenna for each azimuth angle $\theta_u$, is measured beforehand in an anechoic chamber for example, and includes phase difference information geometrically calculated in accordance with the interval between the receive antennas as well as information on coupling between the antenna elements of the receive antennas and the deviations of amplitude errors and phase errors; this also applies to the embodiments described below.

For example, an ideal direction vector $a(\theta_u(f_s))$ with the elements of the receive antennas constituting the array antenna being arranged on a straight line at a regular interval d (see FIG. 6) and no phase and amplitude deviation occurring between the receive antennas is shown by Equation (14).

$$a(\theta_u(f_s)) = \begin{bmatrix} 1 \\ \exp\{j2\pi d \sin\theta_u(f_s)/\lambda\} \\ \vdots \\ \exp\{j2\pi(Na-1)d\sin\theta_u(f_s)/\lambda\} \end{bmatrix} \quad (14)$$

The azimuth angle $\theta_u(f_s)$, represented by Equation (15) for example, is a variable that is varied at certain intervals $\beta$ using a variable u appropriate for Doppler frequency $f_s$ in the estimation range $[\theta_{min}, \theta_{max}]$ for estimating the directions of arrival of reflected wave signals in the radar apparatus 1. The variable u is an integer from 0 to NU. NU is represented by Equation (16). In Equation (16), floor[y] is a function that outputs a largest integer value not exceeding a real number y.

$\theta_u(f_s) \theta_{min} + u\beta$ \hfill (15)

$NU = \text{floor}[(\theta_{max} - \theta_{min})/\beta] + 1$ \hfill (16)

The moving object azimuth estimation unit 24 determines whether the correlation vector $h(k, f_s, w)$ obtained from each of the antenna system processing units D1 to D4 in the w-th Np×Nc transmit periods Tr satisfies the conditional expression using threshold values const1 and const2 shown in Equation (17).

The threshold values const1 and const2 are predetermined real values; threshold value const1 is a predetermined value exceeding the noise level, and threshold value const2 is a predetermined value included in the range of greater than 0 and smaller than 1.

As the threshold value const2 is closer to 1, the moving object azimuth estimation unit 24 selects a reflected wave having a higher correlation (correlation coefficient value) based on the correlation (correlation coefficient value) between the direction vector $a(\theta_u(f_s))$ and the correlation vector $h(k, f_s, w)$. The descriptions of the threshold values const1 and const2 also apply to the embodiments described below.

When the correlation vector $h(k, f_s, w)$ is determined to satisfy the conditional expression using the threshold values const1 and const2 shown in Equation (17), the moving object azimuth estimation unit 24 performs squaring calculation of the inner product of the correlation vector $h(k, f_s, w)$ and a prestored direction vector $a(\theta_u(f_s))$ by Equation (17) to determine the power profile $F_{out}(k, f_s, \theta_u, w)$ for each distance-azimuth-Doppler frequency component in the reflected wave signal from the moving object. The squaring calculation of the inner product of the correlation vector $h(k, f_s, w)$ and the prestored direction vector $a(\theta_u(f_s))$ may instead be calculation of the absolute value of the inner product.

The direction vector $a(\theta_u(f_s))$ used by the moving object azimuth estimation unit 24 is a direction vector included in an angle range excluding the angle range $[\phi(f_s)-BW, \phi(f_s)+BW]$ in which stationary objects are present. That is, the azimuth angle $\theta_u(f_s)$ that determines the direction vector $a(\theta_u(f_s))$ varies in the ranges $\theta_{min} \leq \theta_u(f_s) < \phi(f_s)-BW$ and $\phi(f_s)+BW \leq \theta_u(f_s) < \theta_{max}$ in accordance with Doppler frequencies $f_s\Delta\theta$.

Also, the angle ranges ($\theta_{min} \leq \theta_u(f_s) < \phi(f_s)-BW$ and $\phi(f_s)+BW \leq \theta_u(f_s) < \theta_{max}$) in which moving objects are present are set taking into consideration an error included in the estimated vehicle speed vector calculated by the vehicle travel status estimation unit 21. The azimuth angle estimation range BW may be a fixed value or vary as a function of an error associated with the speed of the vehicle CR (high speed or low speed, for example).

When the correlation vector $h(k, f_s, w)$ is determined not to satisfy the conditional expression using the threshold values and const1 and const2 shown in Equation (17), the moving object azimuth estimation unit 24 determines the power profile $F_{out}(k, f_s, \theta_u, w)$ for each distance-azimuth-Doppler frequency component to be 0 (zero). The power profile $F_{out}(k, f_s, \theta_u, w)$ for each distance-azimuth-Doppler frequency component may also be a prescribed value sufficiently smaller than the level of the reflected wave signals from a moving object, for example, a sufficiently small value equivalent to the noise level, or a predetermined value or symbol indicating that the predetermined conditional expression is not satisfied. The moving object azimuth estimation unit 24 outputs the power profile $F_{out}(k, f_s, \theta_u, w)$ for each distance-azimuth-Doppler frequency component to the moving object detection unit 26.

if $h(k,f_s,w)^H h(k,f_s,w) > const1$ and $|a(\theta_u(f_s))^H h(k,f_s,w)|^2 / a(\theta_u(f_s))^H a(\theta_u(f_s)) > const2 \times h(k,f_s,w)^H h(k,f_s,w)$ then $F_{out}(k,f_s,\theta_u,w) = |a(\theta_u(f_s))^H h(k,f_s,w)|^2$ else $F_{out}(k,f_s,\theta_u,w) = 0$ (17)

Based on the power profile $F_{out}(k, f_s, \theta_u, w)$ obtained from the stationary object azimuth estimation unit 23 in the w-th Np×Nc transmit periods Tr, the stationary object detection unit 25 detects stationary objects around the radar apparatus 1 and outputs stationary object detection information.

More specifically, the stationary object detection unit 25 performs comparison of the power profile $F_{out}(k, f_s, \theta_u, w)$ obtained from the stationary object azimuth estimation unit 23 in the w-th Np×Nc transmit periods Tr with a predetermined threshold value, or adaptive threshold decision (for example, constant false alarm rate (CFAR)) on the power profile $F_{out}(k, f_s, \theta_u, w)$ obtained from the stationary object azimuth estimation unit 23 in the w-th Np×Nc transmit periods Tr.

When the power profile $F_{out}(k, f_s, \theta_u, w)$ is determined to be equal to or higher than the threshold value, the stationary object detection unit 25 outputs the discrete time $k_s$, Doppler frequency $f_{ss}\Delta\theta$, and azimuth angle $\theta_u(f_{ss})$ that give the power profile $F_{out}(k, f_s, \theta_u, w)$ exceeding the threshold value as stationary object detection information.

The stationary object detection unit 25 may also calculate the discrete time $k_s$ as the distance $R_s(k)$ from the radar apparatus 1 to the stationary object by Equation (18). In Equation (18), Tw is the transmission slot in transmit period Tr, L is the code length, and $C_0$ is the speed of light.

$$R_s(k) = k_s \frac{Tw \times C_0}{2L} \quad (18)$$

The stationary object detection unit 25 may also calculate the Doppler frequency $f_{ss}\Delta\theta$ as the relative speed $v_{ds}(f_s)$ of the stationary object with respect to the radar apparatus 1 by Equation (19). In Equation (19), $\lambda$ is the wavelength of the radar transmission signal transmitted from the transmit antenna Tx-ant1.

$$v_{ds}(f_{ss}) = \frac{\lambda}{2} f_{ss}\Delta\theta \quad (19)$$

The moving object detection unit 26 detects moving objects around the radar apparatus 1 based on the power profile $F_{out}(k, f_s, \theta_u, w)$ obtained from the moving object azimuth estimation unit 24 in the w-th Np×Nc transmit periods Tr, and outputs moving object detection information.

More specifically, the moving object detection unit 26 performs comparison of the power profile $F_{out}(k, f_s, \theta_u, w)$ obtained from the moving object azimuth estimation unit 24 in the w-th Np×Nc transmit periods Tr with a predetermined threshold value, or adaptive threshold decision (for example, CFAR) on the power profile $F_{out}(k, f_s, \theta_u, w)$ obtained from the moving object azimuth estimation unit 24 in the w-th Np×Nc transmit periods Tr.

When the power profile $F_{out}(k, f_s, \theta_u, w)$ is determined to be equal to or higher than the threshold value, the moving object detection unit 26 outputs the discrete time $k_m$, Doppler frequency $f_{sm}\Delta\theta$, and azimuth angle $\theta_u(f_{sm})$ that give the power profile $F_{out}(k, f_s, \theta_u, w)$ exceeding the threshold value as moving object detection information.

The moving object detection unit 26 may also calculate the discrete time $k_m$ as the distance $R_m(k)$ from the radar apparatus 1 to the moving object by Equation (20). In Equation (20), Tw is the transmission slot in transmit period Tr, L is the code length, and $C_0$ is the speed of light.

$$R_m(k) = k_m \frac{Tw \times C_0}{2L} \quad (20)$$

The moving object detection unit 26 may also calculate the Doppler frequency $f_{sm}\Delta\theta$ as the relative speed $v_{dm}(f_s)$ of the moving object with respect to the radar apparatus 1 by Equation (21). In Equation (21), $\lambda$ is the wavelength of the radar transmission signal transmitted from the transmit antenna Tx-ant1.

$$v_{dm}(f_{sm}) = \frac{\lambda}{2} f_{sm}\Delta\theta \quad (21)$$

Next, the effects of the radar apparatus 1 according to this embodiment will be described with reference to FIGS. 7A to 7C and 8. FIG. 7A is a diagram describing the positional relationship among the vehicle CR in which the radar apparatus 1L is installed, and nearby stationary objects #1, #2 and moving object #3. FIG. 7A is described on the assumption that the left radar installation angle reference LH of the vehicle agrees with the array antenna azimuth reference LC.

Figure 7B:
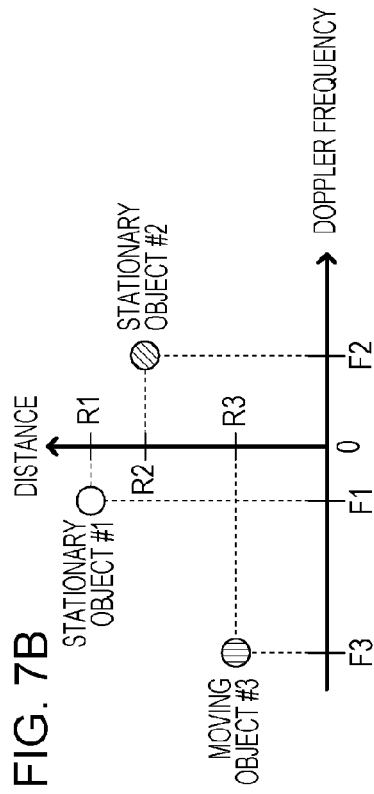
FIG. 7B shows the results of detection of Doppler frequencies from the nearby stationary objects and moving object.
Figure 7C:
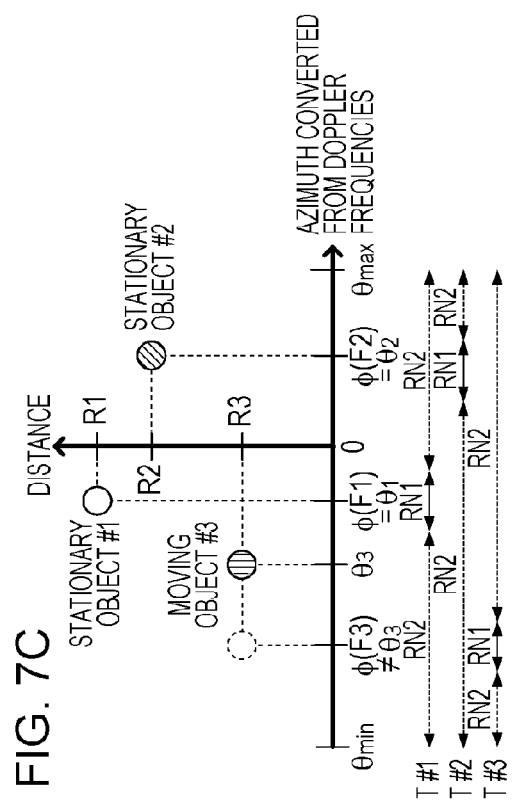
FIG. 7C shows the results of detection with the Doppler frequencies from the nearby stationary objects and moving object converted to azimuth angles.
Figure 7A:
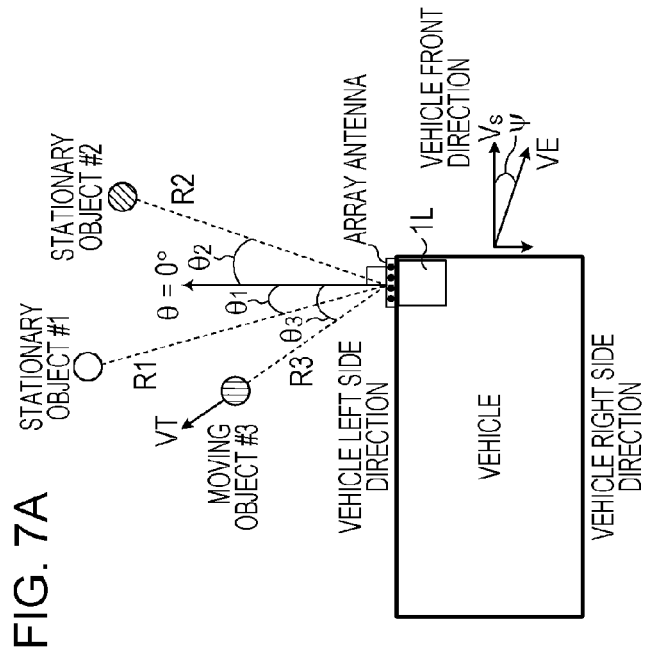
FIG. 7A is a diagram describing the positional relationship among the vehicle in which the radar apparatus 1L is installed, and nearby stationary objects and a moving object.

FIG. 7B shows the results of detection of Doppler frequencies from the nearby stationary objects #1, #2, and moving object #3. FIG. 7C shows the results of detection with the Doppler frequencies from the nearby stationary objects #1, #2, and moving object #3 converted to azimuth angles.

The stationary object #1, stationary object #2, and moving object #3 are located at distances R1, R2, R3, and azimuth angles $\theta_1$, $\theta_2$, $\theta_3$, respectively, relative to the radar apparatus 1L which is installed on the front left side of the vehicle CR, for example. The moving object #3 moves at speed VT in the direction away from the vehicle CR in the range (distance) direction relative to the radar apparatus 1L. The array antenna LAR of the radar apparatus 1L (see FIG. 1) is installed so that its aperture plane is parallel to the left side direction LH of the vehicle CR. In this example, therefore, the installation angle $\gamma$ of the array antenna LAR is 0. The installation angle $\gamma$ is not limited 0, however; it may be $\gamma>0$ or $\gamma<0$.

The vehicle CR travels with a vehicle movement vector VE as shown in FIG. 7A, where the component of the front direction of vehicle CR in the vehicle movement vector VE is Vs [m/s] and the component of the rotation direction of vehicle CR in the vehicle movement vector VE is $\Psi$ [rad/s]. The Doppler frequencies F1, F2, F3 of the stationary object #1, stationary object #2, and moving object #3 are represented by Equations (22), (23), and (24), respectively.

$$F1 = \frac{2}{\lambda} v_s \sin(\theta_1 - \Psi - \gamma) \quad (22)$$

$$F2 = \frac{2}{\lambda} v_s \sin(\theta_2 - \Psi - \gamma) \quad (23)$$

$$F3 = \frac{2}{\lambda} \{v_s \sin(\theta_3 - \Psi - \gamma) - VT\} \quad (24)$$

Here, using Equation (7) which converts Doppler frequencies $f_s\Delta\theta$ into azimuth angle $\phi(f_s)$, the Doppler frequencies F1, F2, F3 shown by Equations (22) to (24) are converted as Equations (25) to (27).

$$\phi(F1) = \arcsin\left[\frac{\lambda F1}{2v_s}\right] + \Psi + \gamma = \theta_1 \quad (25)$$

$$\phi(F2) = \arcsin\left[\frac{\lambda F2}{2v_s}\right] + \Psi + \gamma = \theta_2 \quad (26)$$

$$\phi(F3) = \arcsin\left[\frac{\lambda F3}{2v_s}\right] + \Psi + \gamma \quad (27)$$
$$= \arcsin[\sin(\theta_3 - \Psi - \gamma) - VT/v_s] + \Psi + \gamma \neq \theta_3$$

Equations (25) and (26) show that the Doppler frequencies $f_s$ of the stationary objects #1, #2 are converted to azimuth angles $\phi(f_s)$ by Equation (7) so that Doppler frequencies of the stationary objects #1, #2 are converted to azimuth angles $\theta_1$, $\theta_2$ in which the stationary objects #1, #2 are present respectively (see FIGS. 7B and 7C).

Equation (27), in contrast, shows that the Doppler frequencies $f_s$ of the moving object #3 are converted to azimuth angle $\phi(f_s)$ by Equation (7), but since the velocity of travel VT of the object in range direction is included, the azimuth $\phi(F3)$ determined by converting the Doppler frequencies of the moving object #3 into an azimuth angle does not agree with the azimuth angle $\theta_3$ of the moving object #3 (see FIGS. 7B and 7C).

From the above, the azimuth angle of a stationary object can be computed by conversion from Doppler frequencies to an azimuth angle in the Doppler frequency-azimuth conversion unit 22 when the vehicle movement vector VE is detected without an error. In practice, however, the vehicle movement vector VE contains an error component associated with estimated vehicle speed vector Vs. The stationary object azimuth estimation unit 23 of the radar apparatus 1 in this embodiment accordingly estimates the azimuth angle of a stationary object over an azimuth angle estimation range (measurement range) for stationary objects established based on the estimated vehicle movement vector VE in accordance with the Doppler frequencies $f_s\Delta\theta$.

More specifically, the estimation range for estimating the azimuth angle $\theta_u(f_s)$ in the stationary object azimuth estimation unit 23 is set such that the azimuth angle of the stationary object is estimated in the range $\phi(f_s)-BW \leq \theta_u(f_s) \leq \phi(f_s)+BW$ for the Doppler frequency $f_s$. The stationary object azimuth estimation unit 23 thus can estimate the azimuth angle of a stationary object by setting the azimuth angle estimation range BW in consideration of an error included in the estimated vehicle speed vector computed by the vehicle travel status estimation unit 21 for a vehicle movement vector VE containing error components.

The azimuth angle estimation range BW may be either a fixed value or vary as a function of an error associated with the speed of the vehicle CR (for example, high speed or low speed).

In contrast, since the azimuth angle of a moving object that moves in range (distance) direction has properties that makes it different from the azimuth determined by conversion from Doppler frequencies to an azimuth angle in the Doppler frequency-azimuth conversion unit 22, the moving object azimuth estimation unit 24 can estimate the azimuth angle of the moving object for estimation ranges excluding the estimation range (measurement range) for the azimuth angle of stationary objects, that is, azimuth angle ranges in which no stationary object is present, based on the Doppler frequencies $f_s\Delta\theta$. The estimation ranges over which to estimate the azimuth angle $\theta_u(f_s)$ in the moving object azimuth estimation unit 24 are $\theta_{min} \leq \theta_u(f_s) < \phi(f_s)-BW$ and $\phi(f_s)+BW \leq \theta_u(f_s) \leq \theta_{max}$ for Doppler frequency $f_s$.

Since the stationary object detection unit 25 is able to compute the azimuth angle of a stationary object in the azimuth angle estimation range for stationary objects used by the stationary object azimuth estimation unit 23 on the basis of the estimated vehicle speed vector (Vs [m/s], $\Psi$ [rad/s]) of the vehicle CR, incorrect estimations caused by side lobes and grating lobes in the reflected wave signals received by the array antenna of the radar apparatus 1 can be prevented.

More specifically, since the stationary object detection unit 25 uses the azimuth angle range corresponding to the inside of the main lobe in the reflected wave signal received by the array antenna as the azimuth angle estimation range for stationary objects used in the stationary object azimuth estimation unit 23, the azimuth angle ranges in which side lobes and grating lobes occur in reflected wave signals can be excluded so that an incorrect estimation caused by a side lobe and a grating lobe in reflected wave signals can be prevented.

Additionally, since the radar apparatus 1 does not involve a high resolution azimuth angle estimation algorithm (such as Capon and MUSIC methods) or weighting calculation of the amplitude of reflected wave signals, which are used for suppressing side lobes in conventional arts, in estimation of the azimuth angles of stationary and moving objects, the amount of signal processing in the radar reception unit Rx can be decreased and further a reduction in spatial resolution in estimation of the azimuth angles of stationary and moving objects in the radar apparatus 1 can be prevented.

In addition, since the radar apparatus 1 uses ranges excluding the azimuth angle estimation range used by the stationary object azimuth estimation unit 23 as the azimuth angle estimation ranges for moving objects in the moving object azimuth estimation unit 24, it is possible to detect a moving object moving in the range (distance) direction of the radar apparatus 1 so that the accuracy of separation and detection of stationary and moving objects can be improved.

(Variation of the First Embodiment)

As a variation of the first embodiment (hereinafter referred to as the present variation), a radar apparatus 1A that transmits a radar transmission signal which has been frequency modulated in the radar transmission unit TxA (for example, a chirp pulse of a frequency modulated continuous wave (FMCW)) will be described with reference to FIGS. 9, 10A, and 10B.

Figure 9:
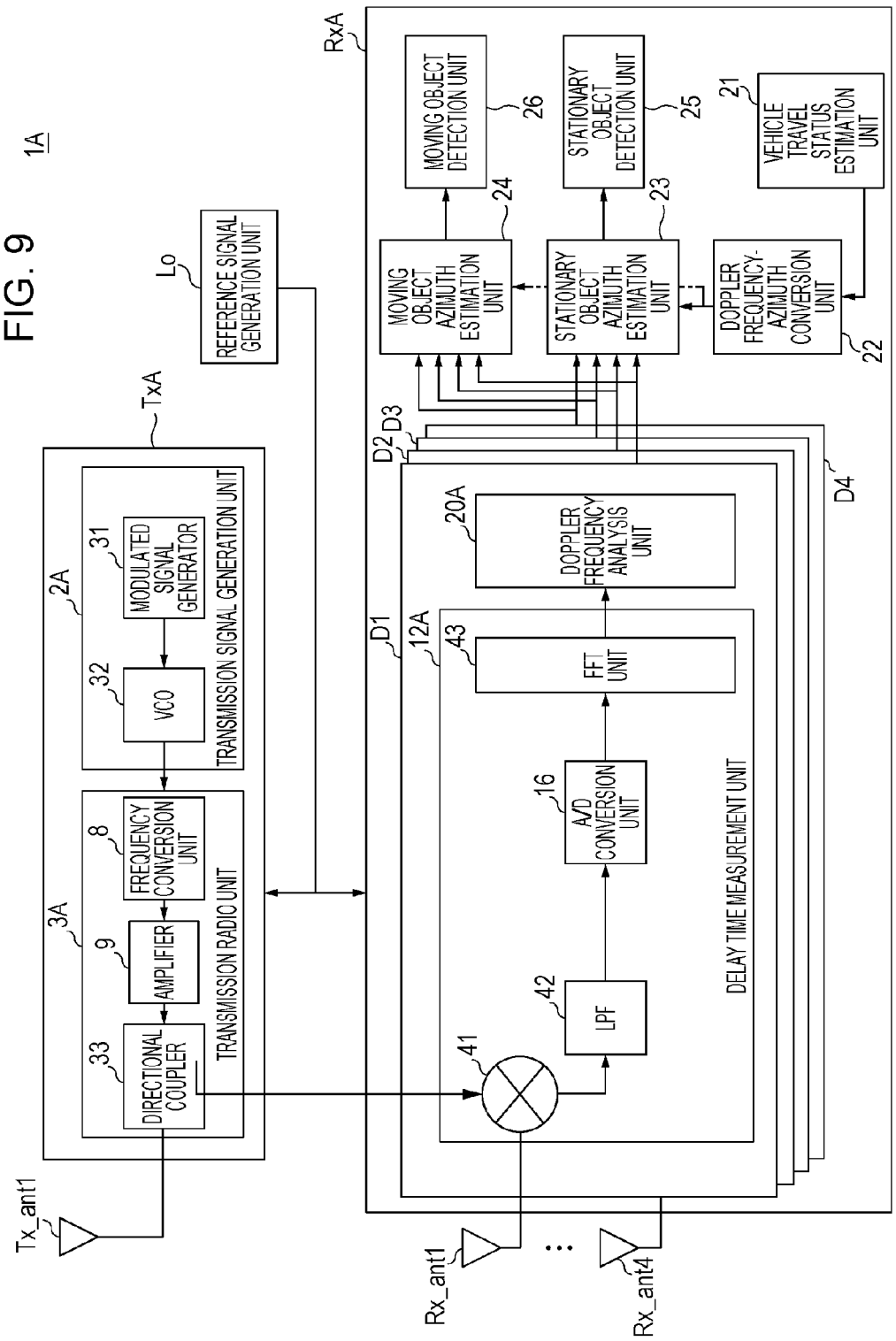
FIG. 9 is a detailed block diagram showing the internal configuration of a radar apparatus as a variation of the first embodiment.

FIG. 9 is a detailed block diagram showing the internal configuration of a radar apparatus as a variation of the first embodiment. FIG. 10A is a diagram illustrating the relationship between a frequency modulated transmission signal and its transmit period. FIG. 10B is a diagram showing a reflected wave received signal resulting from the frequency modulated transmission signal shown in FIG. 10A being reflected off a stationary object or a moving object. For the radar apparatus 1A in the present variation, description of matters overlapping with the radar apparatus 1 according to the first embodiment is simplified or omitted and differences will be described.

The radar apparatus 1A shown in FIG. 9 includes a reference signal generation unit Lo, a radar transmission unit TxA, and a radar reception unit RxA. The radar transmission unit TxA has a transmission signal generation unit 2A which includes a modulated signal generator 31 and a voltage control oscillator (VCO) 32, and a transmission radio unit 3A which includes a frequency conversion unit 8, an amplifier 9, and a directional coupler 33 connected with the transmit antenna Tx_ant1.

The antenna system processing unit D1 of the radar reception unit RxA has a delay time measurement unit 12A which is connected with a single receive antenna Rx_ant1, and a Doppler frequency analysis unit 20A. The delay time measurement unit 12A includes a mixer unit 41, an LPF 42 as an example of a filter unit, an A/D conversion unit 16, and an FFT unit 43.

The operations of the components of the radar transmission unit TxA will be described in detail next.

The modulated signal generator 31 generates a sawtooth wave modulated signal (see FIG. 10A) in each transmit period Tchirp and outputs it to the VCO 32.

The VCO 32 generates a radar transmission signal by frequency modulating the modulated signal generated by the modulated signal generator 31 and outputs it to the frequency conversion unit 8.

The directional coupler 33 outputs part of the radar transmission signal whose power has been amplified in the amplifier 9 to the mixer unit 41 in the delay time measurement unit 12A of the radar reception unit RxA, and transmits the remaining radar transmission signal from the transmit antenna Tx_ant1.

Next, the operations of the components of the radar reception unit RxA will be described in detail.

In the delay time measurement unit 12A, the mixer unit 41 combines the reflected wave signal received by the receive antenna Rx_ant1 with the radar transmission signal output from the directional coupler 33 and passes the resulting signal through the LPF 42 to thereby calculate the correlation between the reflected wave signal and the radar transmission signal, and outputs a correlation signal (see FIG. 10B) including a beat frequency corresponding to the reception delay time (arrival delay time) of the reflected wave signal to the A/D conversion unit 16.

In the delay time measurement unit 12A, the FFT unit 43 performs FFT processing using Ndata discrete sampled values of the correlation signal obtained from A/D conversion unit 16 in each transmit period Tchirp, thereby obtaining the frequency spectrum response (the coherent addition result) CI_chirp($f_b$, m) for the correlation signal. From the frequency spectrum response (coherent addition result) CI_chirp($f_b$, m) for the correlation signal, beat frequency components corresponding to the reception delay time (arrival delay time) of the reflected wave signal included in the correlation signal can be detected.

That is, the FFT unit 43 applies FFT processing to the correlation signal for which correlation has been calculated by the mixer unit 41 and the LPF 42, thereby outputting a correlation signal containing reception delay time (arrival delay time) information associated with the beat frequency component $f_b$. Here, m represents the ordinal number of the transmit period Tchirp, and $f_b$ denotes the frequency bin number in the fast Fourier transform (FFT) performed by the FFT unit 46, being from 1 to Ndata/2.

The Doppler frequency analysis unit 20A uses phase variations ε(f$_s$) (see Equation (28)) corresponding to 2Nf different Doppler frequencies f$_s$Δθ as correlation factors to perform coherent addition in units of frequency spectrum responses (coherent addition results) CI_chirp(f$_b$, Nc(w−1)+1) to CI_chirp(f$_b$, Nc×w), which are Nc outputs from the FFT unit 43 obtained for each beat frequency f$_b$ (see Equation (29)). The Doppler frequency analysis unit 20A outputs the result of Nc coherent additions to the stationary object azimuth estimation unit 23 and the moving object azimuth estimation unit 24.

$$\varepsilon(f_s) = 2\pi f_s(Tchirp)\Delta\theta \quad (28)$$

$$FT\_CI^{Nant}(f_b, f_s, w) = \sum_{q=1}^{Nc} CI\_chirp^{Nant}(f_b, Nc(w-1)+q) \quad (29)$$
$$\exp[-jq\theta(f_s)]$$
$$= \sum_{q=1}^{Nc} CI\_chirp^{Nant}(f_b, Nc(w-1)+q)$$
$$\exp[-jq2\pi f_s Tchirp]$$

FT_CI$_{Nant}$(f$_b$, f$_s$, w) represents the w-th output of the Doppler frequency analysis unit 20A, representing the coherent addition result from the Nant-th antenna system processing unit based on the Doppler frequencies f$_s$Δθ for each beat frequency f$_b$. The value k is from 1 to ((Nr+Nu)×Ns/No). The value f$_s$ includes 0 and is from −Nf+1 to Nf. The term j is an imaginary unit. The term Δθ is the phase rotation unit (a predetermined value).

By calculation of Equation (29), each of the antenna system processing units D1 to D4 obtains FT_CI$_{Nant}$(f$_b$, −Nf+1, w) to FT_CI$_{Nant}$(f$_b$, Nf, w), which are the results of coherent addition based on the 2Nf Doppler frequencies f$_s$Δθ for each beat frequency f$_b$, in each duration of Nc transmit periods Tchirp (Tchirp×Nc).

The discrete time k is replaced with beat frequency f$_b$ in the operation of the stationary object azimuth estimation unit 23, moving object azimuth estimation unit 24, stationary object detection unit 25, and moving object detection unit 26, which are located downstream of the antenna system processing units D1 to D4.

This enables the radar apparatus 1A in the present variation to provide similar effects to the radar apparatus 1 in the first embodiment described above even for transmission that uses a radar transmission signal (a chirp pulse for example) which has been frequency modulated in the radar transmission unit TxA.

While various embodiments have been described with reference to drawings, it will be appreciated that the present disclosure is not limited to those embodiments. It will be apparent to those skilled in the art that various alterations and modifications can be conceived without departing from the scope of the claims, and it is understood that such alterations and modifications are encompassed in the technical scope of the present disclosure.

The present disclosure is useful as a radar apparatus that prevents an incorrect estimation caused by a side lobe or a grating lobe occurring in the azimuth direction in estimation of the azimuth angle of an object using a receive array antenna to improve the accuracy of object detection.

What is claimed is:

1. A radar apparatus for installation in a mobile unit, comprising:
   a radar transmission unit that transmits a radar transmission signal in a high frequency band from a transmit antenna in each transmit period; and
   a radar reception unit that receives a reflected wave signal resulting from the radar transmission signal being reflected off one or more stationary objects or one or more moving objects with each of a plurality of receive antennas,
   wherein the radar reception unit includes
      a plurality of antenna system processing units that each generate a correlation signal including arrival delay information for the reflected wave signal by computing a correlation between the reflected wave signal and the radar transmission signal and that output information based on a first plurality of Doppler frequencies contained in the correlation signal;
      a Doppler frequency-azimuth conversion unit that converts a second plurality of Doppler frequencies estimated frequencies caused by the stationary objects into a first azimuth component in accordance with movement information for the mobile unit in same frequency as the first plurality of Doppler frequencies; and
      a stationary object azimuth estimation unit that generates a first power profile for a first predetermined range including an azimuth in which the present of stationary object is estimated using the result of computation based on the information of the first plurality of Doppler frequencies and the first azimuth component.

2. The radar apparatus according to claim 1, further comprising:
   a stationary object detection unit that outputs a Doppler frequency and an azimuth that make the first power profile equal to or higher than a first predetermined threshold value as detection information for the stationary objects present.

3. The radar apparatus according to claim 1, further comprising:
   a moving object azimuth estimation unit that generates a second power profile for a second predetermined range not including the first azimuth component using the information based on the first plurality of Doppler frequencies.

4. The radar apparatus according to claim 3, further comprising:
   a moving object detection unit that outputs a Doppler frequency and an azimuth that make the second power profile equal to or higher than a second predetermined threshold value as detection information for the moving object present.

5. The radar apparatus according to claim 1, further comprising:
   a moving status estimation unit that computes the movement information for the mobile unit using by a sensor.

6. The radar apparatus according to claim 1,
   wherein the antenna system processing units each include
      a correlation computation unit that computes a correlation value between the reflected wave signal and the radar transmission signal in each transmit period of the radar transmission signal;
      a first coherent addition unit that performs coherent addition of correlation values over a first predetermined number of transmit periods and outputs the results of first coherent additions; and
      a second coherent addition unit that corrects a phase variation of the results of first coherent additions occurring in correspondence to each of the first plurality of Doppler frequencies, and performs coherent addition of the results of correction over a second predetermined number of transmit periods, and outputs the results of second coherent additions as the information based on the first plurality of Doppler frequencies contained in the correlation signal.

7. The radar apparatus according to claim 1,
wherein the radar transmission unit transmits the radar transmission signal generated by frequency modulation of a transmission code from the transmit antenna in each transmit period, and
wherein the antenna system processing units each include
   a mixer unit that combines the reflected wave signal with the radar transmission signal in each transmit period;
   a filter unit that outputs a low frequency component of the combined signal;
   a Fourier transform unit that converts the low frequency component signal into a frequency domain; and
   a Doppler frequency analysis unit that corrects a phase variation of signals converted to the frequency domain occurring in correspondence to each of the first plurality of Doppler frequencies for each frequency component, and performs coherent addition of correction, and outputs a result of third coherent additions as the information based on the first plurality of Doppler frequencies.

8. The radar apparatus according to claim 1, wherein the azimuth components included in the first predetermined range include ±45° or ±135° directions relative to a front direction of the mobile unit.

9. The radar apparatus according to claim 3, wherein the azimuth components included in the second predetermined range include ±45° or ±135° directions relative to the front direction of the mobile unit.

* * * * *